United States Patent
Kasuya et al.

(10) Patent No.: US 9,528,436 B2
(45) Date of Patent: Dec. 27, 2016

(54) HYBRID DRIVE DEVICE

(71) Applicants: Satoru Kasuya, Nishio (JP); Masashi Kito, Anjo (JP); Yuichi Seki, Okazaki (JP); Ryosuke Kondo, Anjo (JP); Osamu Murai, Toyota (JP)

(72) Inventors: Satoru Kasuya, Nishio (JP); Masashi Kito, Anjo (JP); Yuichi Seki, Okazaki (JP); Ryosuke Kondo, Anjo (JP); Osamu Murai, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 995 days.

(21) Appl. No.: 13/762,839

(22) Filed: Feb. 8, 2013

(65) Prior Publication Data

US 2013/0213043 A1    Aug. 22, 2013

Related U.S. Application Data

(60) Provisional application No. 61/676,031, filed on Jul. 26, 2012.

(30) Foreign Application Priority Data

Feb. 10, 2012   (JP) ................................ 2012-027850
Jul. 13, 2012   (JP) ................................ 2012-158159

(51) Int. Cl.
*B60K 6/48*    (2007.10)
*B60K 17/02*   (2006.01)
(Continued)

(52) U.S. Cl.
CPC ................. *F02B 63/04* (2013.01); *B60K 6/40* (2013.01); *B60K 6/48* (2013.01);
(Continued)

(58) Field of Classification Search
CPC ......................... B60K 17/02; F16D 2300/0214
See application file for complete search history.

(56) References Cited

U.S. PATENT DOCUMENTS 6,306,057 B1 * 10/2001 Morisawa .............. B60K 6/365
                                                     475/5
8,555,748 B2   10/2013 Maekawa et al.
(Continued)

FOREIGN PATENT DOCUMENTS

DE   10 2009 042 933 A1   5/2010
JP       A-2004-1708       1/2004
(Continued)

OTHER PUBLICATIONS

May 7, 2013 International Search Report issued in International Application No. PCT/JP2013/053157 (with translation).
(Continued)

*Primary Examiner* — Jacob S Scott
*Assistant Examiner* — Tinh Dang
(74) *Attorney, Agent, or Firm* — Oliff PLC

(57) ABSTRACT

A hybrid drive device having an engine coupling shaft member, a speed change mechanism, a rotating electrical machine, and an engine connecting clutch. A first lubricating oil passage scatters lubricating oil from radially inside to radially outside of first and second friction plates. A first one-way clutch is interposed between an engine coupling shaft member and a coupling member, and is configured to not be engaged when rotation of the engine coupling shaft member becomes lower than rotation of the coupling member. A second one-way clutch is configured not to be engaged when rotation of the rotating electrical machine becomes lower than rotation of the coupling member. An engine driven oil pump generates an oil pressure to be supplied by a driving force of the internal combustion engine or a driving force of the rotating electrical machine (Continued)

regardless of engagement or disengagement of the engine connecting clutch.

15 Claims, 7 Drawing Sheets

(51) Int. Cl.
 *F16D 25/12* (2006.01)
 *F02B 63/04* (2006.01)
 *B60K 6/40* (2007.10)

(52) U.S. Cl.
 CPC .... *B60K 2006/4825* (2013.01); *F16D 25/123* (2013.01); *F16D 2300/0214* (2013.01); *Y02T 10/6221* (2013.01); *Y02T 10/6252* (2013.01)

(56) References Cited

U.S. PATENT DOCUMENTS

| | | | |
|---|---|---|---|
| 8,622,182 B2 | 1/2014 | Iwase et al. | |
| 8,632,438 B2 | 1/2014 | Kuroda et al. | |
| 2004/0214686 A1 | 10/2004 | Katou | |
| 2005/0151429 A1 | 7/2005 | Taketsuna et al. | |
| 2008/0011529 A1 | 1/2008 | Hoher et al. | |
| 2009/0008212 A1 | 1/2009 | Combes et al. | |
| 2009/0100965 A1* | 4/2009 | Sanji | B60K 6/26 74/606 R |
| 2009/0283344 A1 | 11/2009 | Arnold et al. | |
| 2010/0109461 A1 | 5/2010 | Kato et al. | |
| 2011/0121692 A1 | 5/2011 | Iwase et al. | |
| 2011/0240431 A1 | 10/2011 | Iwase et al. | |
| 2012/0032538 A1 | 2/2012 | Kasuya et al. | |
| 2012/0080248 A1 | 4/2012 | Kasuya et al. | |
| 2012/0080286 A1 | 4/2012 | Kasuya et al. | |
| 2012/0319514 A1 | 12/2012 | Iwase et al. | |

FOREIGN PATENT DOCUMENTS

| | | |
|---|---|---|
| JP | A-2004-324818 | 11/2004 |
| JP | 2006-248417 A | 9/2006 |
| JP | A-2006-298272 | 11/2006 |
| JP | A-2008-501566 | 1/2008 |
| JP | A-2008-24298 | 2/2008 |
| JP | A-2009-1127 | 1/2009 |
| JP | A-2009-72052 | 4/2009 |
| JP | A-2009-261214 | 11/2009 |
| JP | A-2010-105615 | 5/2010 |
| JP | A-2010-196868 | 9/2010 |
| JP | A-2010-276035 | 12/2010 |
| JP | A-2011-105192 | 6/2011 |
| JP | A-2011-152814 | 8/2011 |
| JP | A-2011-213230 | 10/2011 |
| JP | A-2011-214595 | 10/2011 |
| KR | 10-2009-0040543 | 4/2009 |
| KR | 10-2010-0008470 | 1/2010 |
| WO | 2004/019468 A | 3/2004 |
| WO | WO 2008/025691 A1 | 3/2008 |
| WO | WO 2012/017770 A1 | 2/2012 |
| WO | WO 2012/039378 A1 | 3/2012 |

OTHER PUBLICATIONS

May 7, 2013 International Search Report issued in International Application No. PCT/JP2013/053159 (with translation).
May 7, 2013 International Search Report issued in International Application No. PCT/JP2013/053160 (with translation).
U.S. Appl. No. 14/361,908, filed May 30, 2014 in the name of Kasuya et al.
U.S. Appl. No. 14/361,435, filed May 29, 2014 in the name of Kasuya et al.
Jul. 27, 2015 Office Action issued in U.S. Appl. No. 14/361,908.

* cited by examiner

HYBRID DRIVE DEVICE

INCORPORATION BY REFERENCE

The disclosure of Japanese Patent Application No. 2012-027850 filed on Feb. 10, 2012, U.S. Provisional Application No. 61/676,031 filed on Jul. 26, 2012, and Japanese Patent Application No. 2012-158159 filed on Jul. 13, 2012 including the specification, drawings and abstract is incorporated herein by reference in its entirety.

BACKGROUND OF THE INVENTION

The present invention relates to hybrid drive devices that are mounted on vehicles etc., and more particularly to hybrid drive devices that include an engine connection clutch between an engine coupling shaft member and an input shaft member of a speed change mechanism having a rotating electrical machine coupled thereto.

DESCRIPTION OF THE RELATED ART

In recent years, hybrid vehicles combining an internal combustion engine and a motor generator (hereinafter simply referred to as the "motor") as power sources have been developed. In a hybrid drive device proposed as one form of hybrid drive devices for use in such hybrid vehicles, a rotating electrical machine (motor generator) drivingly coupled to an input shaft of a speed change mechanism, and an engine connecting clutch performing engagement/disengagement of (engaging or disengaging) an engine coupling clutch drivingly coupled to an internal combustion engine and the input shaft are placed in a portion of a starting device (e.g., a torque converter etc.) of a common automatic transmission so that a parallel hybrid drive device is formed by simple replacement (see Japanese Patent Application Publication No. 2008-24298 (JP 2008-24298 A)).

SUMMARY OF THE INVENTION

A lubricating method is also possible in which the engine connecting clutch is hermetically sealed and contained in a clutch accommodating case to circulate lubricating oil in a so-called oil-tight manner. In this method, however, the clutch accommodating case is filled with oil. Therefore, the engine connecting clutch has great drag loss especially during EV driving during which the engine connecting clutch is disengaged and the motor generator is used, etc. This hinders improvement in fuel economy (electricity economy) and improvement in controllability. Accordingly, as described in, e.g., Korean Patent Application Publication No. 10-2010-0008470, it is preferable to lubricate (cool) the engine connecting clutch by supplying lubricating oil from the central axis without hermetically sealing the engine connecting clutch.

However, in the hybrid drive device of JP 2008-24298 A, a transmission path is formed by the engine connecting clutch, the rotating electrical machine, the speed change mechanism, and wheels sequentially from the internal combustion engine, and a mechanical oil pump drivingly coupled to the input shaft of the speed change mechanism (on the speed change mechanism side of the engine connecting clutch) is provided so that an oil pressure hydraulically controlling the speed change mechanism can be generated during EV driving using the driving force of the rotating electrical machine with the engine connecting clutch being disengaged. Accordingly, when starting the vehicle while slipping the engine connecting clutch by the driving force of the internal combustion engine, the engine connecting clutch is kept in the slipped state for a long time. However, the mechanical oil pump drivingly coupled to the input shaft of the speed change mechanism is not driven together with the wheels while the vehicle is stopped, and lubricating oil cannot be supplied to the engine connecting clutch.

As described above, when starting the vehicle by using the driving force of the internal combustion engine, etc., there is a case where the engine connecting clutch is slipped for a long time. In this case, a large amount of heat is generated by the engine connecting clutch, whereby an extremely larger amount of lubricating oil (e.g., several times to a dozen of times) is required as compared to the lubricating method in which the lubricating oil is circulated in the oil-tight manner.

German Patent Application Publication No. 10-2009-042933 discloses a hybrid drive device provided with an oil pump that is driven by the driving force of an internal combustion engine or the driving force of a rotating electrical machine by using two one-way clutches. However, this German Patent Application Publication does not describe how to cool an engine connecting clutch.

It is an object of the present invention to provide a hybrid drive device that reduces drag of an engine connecting clutch and that is capable of ensuring capability to cool the engine connecting clutch.

A hybrid drive device according to an aspect of the present invention includes: an engine coupling shaft member that is drivingly coupled to an internal combustion engine; a speed change mechanism that shifts rotation received by an input shaft member and outputs the shifted rotation to a wheel; a rotating electrical machine drivingly coupled to the input shaft member; a housing case containing the rotating electrical machine; an engine connecting clutch that has a first friction plate drivingly coupled to the engine coupling shaft member, a second friction plate drivingly coupled to the input shaft member, and a hydraulic servo engaging or disengaging the first friction plate and the second friction plate, and that has both the first friction plate and the second friction plate placed in the housing case; a first lubricating oil passage that scatters lubricating oil from radially inside to radially outside of the first friction plate and the second friction plate to lubricate the first friction plate and the second friction plate; a coupling member; a first one-way clutch that is interposed between the engine coupling shaft member and the coupling member, and that is not engaged when rotation of the engine coupling shaft member becomes lower than rotation of the coupling member; a second one-way clutch that is interposed between the rotating electrical machine and the coupling member, and that is not engaged when rotation of the rotating electrical machine becomes lower than rotation of the coupling member; and an engine driven oil pump that is drivingly coupled to the coupling member and generates an oil pressure to be supplied to the first lubricating oil passage by a driving force of the internal combustion engine or a driving force of the rotating electrical machine regardless of engagement or disengagement of the engine connecting clutch.

Thus, the hybrid drive device of the aspect of the present invention includes the engine driven oil pump that generates the oil pressure to be supplied to the first lubricating oil passage by the driving force of the internal combustion engine or the driving force of the rotating electrical machine regardless of engagement or disengagement of the engine connecting clutch. Accordingly, drag of the engine connecting clutch can be reduced as compared to, e.g., the case where lubricating oil is circulated in a case in which the first friction plate and the second friction plate are hermetically sealed. Moreover, especially when starting the vehicle by using the driving force of the internal combustion engine, which requires a large amount of lubricating oil for the first and second friction plates placed in air, the engine connecting clutch can be engaged with a sufficient amount of lubricating oil being generated by the engine driven oil pump by driving of the internal combustion engine. Thus, capability to cool the engine connecting clutch can be ensured.

The hybrid drive device according to the aspect of the present invention may further include: a second lubricating oil passage that supplies the oil to the rotating electrical machine.

Thus, since the hybrid drive device of the aspect of the present invention includes the second lubricating oil passage that supplies oil to the rotating electrical machine, oil can be supplied from the second lubricating oil passage to the rotating electrical machine independently of the first lubricating oil passage, whereby oil can be supplied at a required flow rate to the engine connecting clutch without being affected by oil supply to the rotating electrical machine.

In the hybrid drive device according to the aspect of the present invention, the engine coupling shaft member may have a recessed portion in an axial tip end of the engine coupling shaft member, the input shaft member may have a tip end of the input shaft member inserted in the recessed portion, and the input shaft member and the recessed portion may be sealed by a seal member, the input shaft member may have a first oil passage formed in an axial direction and closed at the tip end, a second oil passage formed so as to extend through the input shaft member in a radial direction from the first oil passage, and a third oil passage formed parallel to the first oil passage in the axial direction and opened at the tip end, the engine coupling shaft member may have a fourth oil passage communicating with the third oil passage and formed in the axial direction, and a fifth oil passage formed so as to extend through the engine coupling shaft member in the radial direction from the fourth oil passage, the first lubricating oil passage may be formed by the first oil passage and the second oil passage, and the second lubricating oil passage may be formed by the third oil passage, the fourth oil passage, and the fifth oil passage.

Thus, since the first lubricating oil passage is formed by the first oil passage and the second oil passage, the second lubrication oil passage is formed by the third oil passage, the fourth oil passage, and the fifth oil passage, and the seal member is placed between the input shaft member and the recessed portion, the first lubricating oil passage and the second lubricating oil passage can be prevented from crossing each other.

In the hybrid drive device according to the aspect of the present invention, the first one-way clutch and the second one-way clutch may be lubricated by oil supplied from the second lubricating oil passage.

Thus, since the first one-way clutch and the second one-way clutch can be lubricated by the oil supplied from the second lubricating oil passage, a required flow rate can be supplied to the engine connecting clutch without being affected by lubrication of the first one-way clutch and the second one-way clutch. Moreover, the first one-way clutch and the second one-way clutch can be cooled with a stable amount of lubricating oil without being affected by heat generation of the engine connecting clutch.

In the hybrid drive device according to the aspect of the present invention, the oil that has lubricated the first one-way clutch and the second one-way clutch may be supplied to the rotating electrical machine.

Thus, since oil that has lubricated the first one-way clutch and the second one-way clutch is supplied to the rotating electrical machine, the size of the engine driven oil pump and an electric oil pump can be reduced as compared to the case where a lubricating oil passage that is used to lubricate the first one-way clutch and the second one-way clutch is additionally provided independently of the first lubricating oil passage and the second lubricating oil passage.

The hybrid drive device according to the aspect of the present invention may include: flow rate adjusting means that adjusts a flow rate of oil to be supplied to the first lubricating oil passage. The second lubricating oil passage may branch off at a position upstream of the flow rate adjusting means.

Thus, since the rotating electrical machine is lubricated by the second lubricating oil passage that branches off from the first lubricating oil passage at a position upstream of the flow rate adjusting means, a required flow rate can be supplied to the engine connecting clutch without being affected by cooling of the rotating electrical machine. Moreover, the rotating electrical machine can be cooled by the second lubricating oil passage that does not cross the first lubricating oil passage, while being hardly affected by flow rate adjustment of the flow rate adjusting means, and the rotating electrical machine can be cooled with a stable amount of lubricating oil without being affected by heat generation of the engine connecting clutch.

In the hybrid drive device according to the aspect of the present invention, the engine connecting clutch may have a clutch drum drivingly coupled to the input shaft member, the second friction plate may have an outer peripheral side of the second friction plate drivingly coupled to the clutch drum, and the clutch drum may have a through hole that is positioned so as to at least partially overlap the second friction plate as viewed in a radial direction, and that discharges the oil supplied to the first and second friction plates.

Thus, since the clutch drum of the engine connecting clutch has the through hole that is positioned so as to at least partially overlap the second friction plate as viewed in the radial direction, and that discharges the oil supplied to the first and second friction plates, a large amount of lubricating oil that has cooled the first and second friction plates can be discharged into the housing case for circulation.

The hybrid drive device according to the aspect of the present invention may include: a control portion that controls a hydraulic control device so as to supply the oil pressure generated by the engine driven oil pump to the engine connecting clutch while the engine connecting clutch is slipped.

Thus, capability to cool the engine connecting clutch can be ensured even when the engine connecting clutch is in the slipped state.

DETAILED DESCRIPTION OF THE EMBODIMENTS

First Reference Example

A hybrid drive device 1 according to a first reference example of the present invention will be described below with reference to FIGS. 1 and 2. The hybrid drive device 1 according to the first reference example is preferably mounted on front engine front drive (FF) vehicles, and the lateral direction in the figures corresponds to the lateral direction in the state where the hybrid drive device 1 is actually mounted on a vehicle. For convenience of description, the "front side" refers to the side of a driving source such as an engine, and the "rear side" refers to the opposite side from the driving source. As used herein, the expression "drivingly coupled" refers to the state where rotating elements are coupled together so that the driving force can be transmitted therebetween, and is used as a concept including the state where the rotating elements are coupled together so as to rotate together, or the state where the rotating elements are coupled together so that the driving force can be transmitted therebetween via a clutch etc.

[General Configuration of Hybrid Drive Device]

Figure 1:
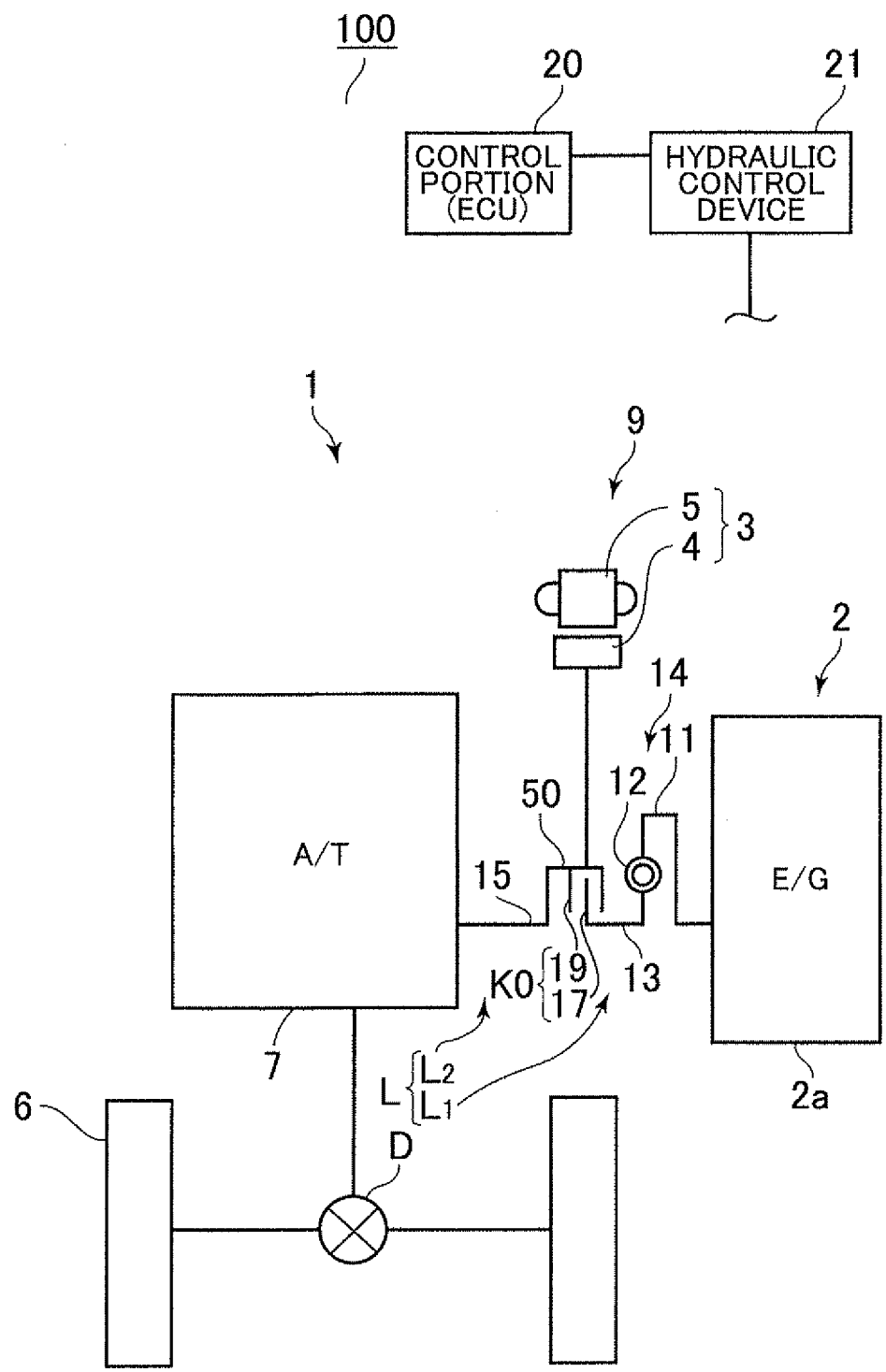
FIG. 1 is a schematic diagram showing a hybrid car to which the present invention can be applied.

As shown in FIG. 1, a hybrid vehicle (hereinafter simply referred to as the "vehicle") 100 has a rotating electrical machine (motor generator) 3 in addition to an internal combustion engine 2 as driving sources. The hybrid drive device 1 forming a power train of the vehicle 100 has a speed change mechanism 7 provided on a power transmission path L between the internal combustion engine 2 and wheels 6, an input portion 9 placed between the speed change mechanism 7 and the internal combustion engine 2 to receive power from the internal combustion engine 2, and a connection portion 14 connecting the input portion 9 to the internal combustion engine 2 while absorbing pulsations of the internal combustion engine 2.

The connection portion 14 is provided with a damper 12 that is connected to a crankshaft 2a of the internal combustion engine 2 via a drive plate 11, and the damper 12 is connected to an engine coupling shaft (engine coupling shaft member) 13 that serves also as an input member as the input portion 9. That is, the engine coupling shaft 13 is drivingly coupled to the internal combustion engine 2 via the damper 12.

The input portion 9 includes a clutch (engine connecting clutch) K0 that permits and blocks power transmission between the engine coupling shaft 13 and an input shaft 15 of the speed change mechanism 7, and the motor generator (rotating electrical machine) 3 drivingly coupled to a clutch housing 50. The motor generator (hereinafter simply referred to as the "motor") 3 has a rotor 4 coupled to the clutch housing 50, and a stator 5 placed radially outward of the rotor 4 so as to face the rotor 4.

The clutch K0 is a multi-plate clutch formed by a plurality of inner friction plates (first friction plates) 17 and a plurality of outer friction plates (second friction plates) 19 which are accommodated in a space S1 inside the clutch housing 50. The clutch housing 50 is coupled to the input shaft (input shaft member) 15 of the speed change mechanism 7 so as to rotate together therewith. That is, the clutch K0 has the inner friction plates 17 that are drivingly coupled to a transmission path $L_1$ on the internal combustion engine side of the transmission path L, and the outer friction plates 19 that are drivingly coupled to a transmission path $L_2$ on the wheel side of the transmission path L, and the clutch housing 50 is also drivingly coupled to the transmission path $L_2$ on the wheel side.

The speed change mechanism 7 is, e.g., a speed change mechanism capable of changing the transmission path based on the engagement state of a plurality of friction engagement elements (clutches and brakes) to attain six forward speeds and one reverse speed. An output member of the speed change mechanism 7 is connected to the driving wheels 6 via a differential unit D. The speed change mechanism 7 may be, e.g., a stepped speed change mechanism that attains three to five forward speeds or seven or more forward speeds, or a stepless speed change mechanism such as a belt type continuously variable transmission, a toroidal continuously variable transmission, or a cone ring type continuously variable transmission. That is, the present invention can be applied to any speed change mechanism.

As described above, in the hybrid drive device 1, the connection portion 14, the input portion 9 having the clutch K0 and the motor 3, and the speed change mechanism 7 are sequentially arranged from the internal combustion engine 2 side toward the wheel 6 side. When the vehicle travels by driving both the internal combustion engine 2 and the motor 3, a control portion (ECU) 20 controls a hydraulic control device 21 to engage the clutch K0. During EV driving during which the vehicle travels only by the driving force of the motor 3 drivingly coupled to the transmission path $L_2$ on the wheel side, the control portion 21 controls the hydraulic control device 21 to disengage the clutch K0, thereby disconnecting the transmission path $L_1$ on the internal combustion engine 2 side from the transmission path $L_2$ on the wheel 6 side.

[Configuration of Input Portion]

The configuration of the input portion 9 will be described in detail below with reference to FIG. 2. As shown in FIG. 2, the clutch K0 and the motor 3 are accommodated in a housing case 26 fixed by a bolt 29 to a transmission case 23 accommodating the speed change mechanism 7. An internal space S2 of the housing case 26 in which the clutch K0 and the motor 3 are accommodated is separated from the connection portion 14 by a partition wall 27 integrally attached to the housing case 26, thereby forming a closed space.

The engine coupling shaft 13 that is connected to the internal combustion engine 2 via the damper 12 of the connection portion 14, and the input shaft 15 of the speed change mechanism 7 are coaxially arranged on the center side of the housing case 26. The engine coupling shaft 13 is rotatably supported with respect to the partition wall 27 by a needle bearing b3, and is rotatably supported with respect to the partition wall 27 via a ball bearing b2, which is fitted in a support portion 83a of a pump body 83 fixed to the partition wall 27 and described in detail below, a rotor hub 51, and a needle bearing b4.

The input shaft 15 is rotatably supported via a cylinder member 41, described in detail below, by a ball bearing b1 that is fitted in a support portion 73a of a pump body 73 fixed to a partition wall 24 fixed to the transmission case 23.

A flange portion 13a is formed at the rear end on the speed change mechanism 7 side of the engine coupling shaft 13. A clutch hub 49, with which the plurality of inner friction plates 17 of the clutch K0 are spline engaged, are fixedly attached to the flange portion 13a. That is, the inner friction plates 17 are drivingly coupled to the engine coupling shaft 13.

The clutch K0 generally has the plurality of inner friction plates 17, the outer friction plates 19 arranged alternately with the inner friction plates 17, and a hydraulic servo 40 that performs engagement/disengagement of (engages or disengages) the inner friction plates 17 and the outer friction plates 19. The hydraulic servo 40 has the cylinder member 41 forming a hydraulic cylinder of the hydraulic servo 40 and drivingly coupled to the input shaft 15, a drum member 42 fixedly attached to the outer peripheral side of a flange portion 41b of the cylinder member 41, a piston 43 placed so as to be axially movable with respect to the cylinder member 41 and placed so that its tip end faces the outer friction plate 19 (or the inner friction plate 17), a return plate 44 positioned with respect to a boss portion 41a of the cylinder member 41 by a snap ring 48, and a return spring 45 provided in a compressed manner between the piston 43 and the return plate 44. A hydraulic oil chamber 46 is formed between the cylinder member 41 and the piston 43, and a canceling oil chamber 47 that cancels a centrifugal oil pressure is formed between the piston 43 and the return plate 44.

The cylinder member 41 and the drum member 42 form an integral clutch drum, and the plurality of outer friction plates 19 are spline engaged with the inner side of the drum member 42. That is, the outer friction plates 19 are drivingly coupled to the input shaft 15 via the drum member 42 and the cylinder member 41.

On the other hand, the stator 5 of the motor 3 is fixed between the outer peripheral side of the clutch K0 and the inner peripheral side of the housing case 26. The stator 5 has a stator core 5a, and coil ends 5b, 5b forming looped portions of a coil wound around the stator core 5a and protruding on both axial sides of the stator core 5a. The rotor 4 of the motor 3 is placed so as to face the inner peripheral side of the stator core 5a with a predetermined gap therebetween.

The rotor hub 51 supporting the rotor 4 is fixed to the drum member 42 by a bolt 55. The rotor hub 51 has a drum-shaped holding portion 51b that grips and holds a rotor core 4a of the rotor 4, and a flange-shaped support portion 51a that supports the holding portion 51b with respect to the pump body 83 and the engine coupling shaft 13. The support portion 51a is rotatably supported by the ball bearing b2 and the needle bearing b4 with respect to the pump body 83 and the engine coupling shaft 13, and is also supported in the axial direction by a thrust bearing b6 provided between the support portion 51a and the flange portion 13a of the engine coupling shaft 13. A thrust bearing b5 is provided between the flange portion 13a of the engine coupling shaft 13 and the boss portion 41a of the cylinder member 41, so that the engine coupling shaft 13 and the cylinder member 41 are positioned and supported in the axial direction.

The cylinder member 41, the drum member 42, and the rotor hub 51, which are described above, form the clutch housing 50 including the space S1 where the hydraulic servo 40, the inner friction plates 17, and the outer friction plates 19 are arranged. A plurality of communication holes 51c are formed in the support portion 51a of the rotor hub 51 forming the clutch housing 50 so as to be located radially outward of the outer friction plates 19 (preferably, so as to open to the inner peripheral surface of the holding portion 51b). These communication holes 51c allow the space S1 included in the clutch housing 50 to communicate with the internal space S2 of the housing case 26. That is, the clutch K0 is a wet multi-plate clutch in which the inner friction plates 17 and the outer friction plates 19 are not made oil-tight (non-oil-tight) and are open to the atmosphere in the housing case 26 so that the inner friction plates 17 and the outer friction plates 19 are arranged in air.

The clutch housing 50 is accurately and firmly supported by a so-called both end support structure by the ball bearing b2 supporting the support portion 51a of the rotor hub 51 on the front side of the clutch housing 50 and the ball bearing b1 supporting the cylinder member 41 on the rear side of the clutch housing 50. This can ensure high support accuracy of the rotor 4, and can reduce the air gap between the rotor 4 and the stator 5, thereby improving performance as the motor 3.

In the clutch K0 configured as described above, when an engagement pressure is supplied from the hydraulic control device 21 to the hydraulic oil chamber 46 of the hydraulic servo 40 through an oil passage a11 formed in the partition wall 24, oil passages a12, a13, a14 formed in the input shaft 15, and an oil passage a15 formed in the boss portion 41a of the cylinder member 41 based on a command of the control portion 20, the piston 43 moves forward in the axial direction against the biasing force of the return spring 45 to engage the inner friction plates 17 and the outer friction plates 19. Thus, the internal combustion engine 2 is drivingly coupled to the speed change mechanism 7, and the vehicle 100 is brought into a hybrid driving state where the vehicle 100 can travel by using the driving forces of the internal combustion engine 2 and the motor 3.

On the contrary, when the engagement pressure is discharged (drained) from the hydraulic oil chamber 46 of the hydraulic servo 40 through the oil passages a11 to a15 by the hydraulic control device 21 based on a command of the control portion 20, the piston 43 moves rearward in the axial direction based on the biasing force of the return spring 45 to disengage the inner friction plates 17 and the outer friction plates 19. Thus, the internal combustion engine 2 is disconnected from the speed change mechanism 7, and the vehicle 100 is brought into an EV driving state where the vehicle 100 can travel by using only the driving force of the motor 3.

A lubrication pressure (a pressure to be supplied to a lubricating oil passage) generated by the hydraulic control device 21 based on an oil pressure generated by an input-shaft cooperative oil pump 70 and an engine driven oil pump 80, which will be described later in detail, is supplied from an oil passage in the partition wall 24, not shown, through a lubricating oil passage a21 formed in the input shaft 15 to a lubricating oil passage a22 formed by the gap between the engine coupling shaft 13 and the input shaft 15, and is supplied to the canceling oil chamber 47 through a lubricating oil passage a23 formed in the boss portion 41a of the cylinder member 41. The lubricating oil that has overflown the cancelling oil chamber 47 flows from the thrust bearing b5 through a through hole 49a of the clutch hub 49, and is scattered to the inner friction plates 17 and the outer friction plates 19, thereby lubricating and cooling the inner friction plates 17 and the outer friction plates 19. That is, the lubricating oil passages a21 to a23 are oil passages that are used to scatter the lubricating oil from the center side of the clutch K0 to lubricate the clutch K0.

The lubricating oil that has lubricated and cooled the inner friction plates 17 and the outer friction plates 19 flows through a through hole 42a of the drum member 42, and is discharged to a region between the drum member 42 and the holding portion 51b of the rotor hub 51 in the space S1 in the clutch housing 50. The lubricating oil that is present in the region between the drum member 42 and the holding portion 51b of the rotor hub 51 in the space S1 in the clutch housing 50 is discharged into the internal space S2 of the housing case 26 through the plurality of communication holes 51c, is guided downward along the inner surface of the housing case 26, and is collected by an oil pan, not shown, attached to the lower part of the hybrid drive device 1.

[Configuration of Input-Shaft Cooperative Oil Pump]

The configuration of the input-shaft cooperative oil pump 70 will be described below. The input-shaft cooperative oil pump 70 is provided on the outer periphery of the input shaft 15 so as to be located between the clutch K0 and the speed change mechanism 7 in the axial direction. The input-shaft cooperative pump 70 has a drive gear 71 and a driven gear 72 which form an internal gear oil pump, and has the pump body 73 accommodating the drive gear 71 and the driven gear 72. The input-shaft cooperative oil pump 70 is formed by fastening the partition wall 24 to the pump body 73 by a bolt 79 so that the partition wall 24 closing the speed change mechanism 7 serves as a cover closing the gear accommodating portion of the pump body 73.

The drive gear 71 of the input-shaft cooperative oil pump 70 is drivingly coupled to the rear end side of the boss portion 41a of the cylinder member 41 coupled to the outer periphery of the input shaft 15. Specifically, this driving coupling is implemented by engaging a key formed on the inner peripheral side of the drive gear 71 with a key groove formed in the rear end of the boss portion 41a. That is, the input-shaft cooperative oil pump 70 is placed on the transmission path $L_2$ located on the speed change mechanism 7 side of the clutch K0 (see FIG. 1) so that the input-shaft cooperative oil pump 70 is drivingly coupled to the motor 3, and is drivingly coupled to the internal combustion engine 2 when the clutch K0 is engaged.

A rotor (exciting coil) 61 is fixedly attached to the inner peripheral side of the drum member 42 fixed to the rotor 4 of the motor 3, and a stator (detection coil) 62 is fixedly attached to the outer peripheral side of the support portion 73a of the pump body 73 by a bolt 69 so as to face the rotor 61. The rotor 61 and the stator 62 form a resolver 60 that detects rotation of the motor 3.

The input-shaft cooperative oil pump 70 thus drivingly coupled to the input shaft 15 is driven by the driving force of the motor 3 and the internal combustion engine 2 or by the inertial force of the vehicle via the speed change mechanism 7 when in a coast state (when the engine brake is in operation) during EV driving or hybrid driving. The input-shaft cooperative oil pump 70 thus sucks the oil through an input port 70a communicating with the oil pan, not shown, and generates an oil pressure from a discharge port 70b to supply the oil pressure to the hydraulic control device 21 through the oil passage formed in the partition wall 24, etc.

The input-shaft cooperative oil pump 70 is drivingly coupled to the input shaft 15 of the speed change mechanism 7. Accordingly, while the vehicle is stopped, the input-shaft cooperative oil pump 70 is also stopped and no oil pressure can be generated unless, e.g., the vehicle is brought into a special state where the speed change mechanism 7 is brought into a neutral state and the input shaft 15 is driven by the motor 3 and the internal combustion engine 2 (by engaging the clutch K0) (e.g., the state where the motor 3 is driven by the driving force of the internal combustion engine 2 to perform charging, etc.). Accordingly, during normal stopping of the vehicle (when charging is not particularly required, etc.), an electric oil pump, not shown, supplies a required oil pressure to the hydraulic control device 21.

[Configuration of Engine Driven Oil Pump]

The configuration of the engine driven oil pump 80 will be described below. The engine driven oil pump 80 is provided on the outer periphery of the engine coupling shaft 13 so as to be located between the internal combustion engine 2 (the connection portion 14) and the clutch K0 in the axial direction, and to be located on the inner peripheral side of the coil end 5b on the internal combustion engine 2 side of the motor 3. That is, the engine driven oil pump 80 is positioned so as to overlap the motor 3 in the axial direction as viewed in the radial direction.

The engine driven oil pump 80 has a drive gear 81 and a driven gear 82 which form an internal gear oil pump, and has the pump body 83 accommodating the drive gear 81 and the driven gear 82. The engine driven oil pump 80 is formed by fastening the pump body 83 to the partition wall 27 by a bolt 89 so that the partition wall 27 closing the housing case 26 serves as a cover closing the gear accommodating portion of the pump body 83.

The drive gear 81 of the engine driven oil pump 80 is drivingly coupled to the outer periphery of the engine coupling shaft 13. Specifically, this driving coupling is implemented by a coupling structure 88 formed by engaging a key formed on the inner peripheral side of the drive gear 81 with a key groove formed in the engine coupling shaft 13. That is, the engine driven oil pump 80 is placed so that it can be drivingly coupled to the transmission path $L_1$ located on the internal combustion engine 2 side of the clutch K0 (see FIG. 1).

The engine driven oil pump 80 thus drivingly coupled to the engine coupling shaft 13 is driven by the driving forces of the motor 3 and the internal combustion engine 2 or by the inertial force of the vehicle via the speed change mechanism 7 when in the coast state (when the engine brake is in operation) during hybrid driving. In particular, when starting the vehicle from its stopped state by the driving force of the internal combustion engine 2 while slip engaging the clutch K0, the engine driven oil pump 80 is driven by the driving force of the internal combustion engine 2 from before engagement of the clutch K0 (i.e., from when the vehicle is in the stopped state).

When driven as described above, the engine driven oil pump 80 sucks oil from an input port 80a communicating with the oil pan, not shown, and generates an oil pressure from a discharge port 80b to supply the oil pressure to the hydraulic control device 21 through an oil passage formed in the partition wall 27, etc., even while the vehicle is stopped. Accordingly, when starting the vehicle by the driving force of the internal combustion engine 2, not only the oil pressure of the electric oil pump, not shown, but also the oil pressure of the engine driven oil pump 80 are applied. Thus, the lubrication pressure, which is used to supply a large amount of lubricating oil required in the slip engaged state when starting the vehicle, can be generated not only by the electric oil pump but also by the engine driven oil pump 80.

Conclusion of First Reference Example

As described above, the hybrid drive device 1 of the first reference example includes the engine driven oil pump 80 that generates an oil pressure to be supplied to the first lubricating oil passage, which is used to supply the lubricating oil to the first and second friction plates 17, 19 placed in air, by the driving force of the internal combustion engine 2 regardless of engagement or disengagement of the clutch K0. Accordingly, drag of the clutch K0 can be reduced as compared to, e.g., the case where lubricating oil is circulated in a case in which the first friction plates 17 and the second friction plates 19 are hermetically sealed. Moreover, especially when starting the vehicle by using the driving force of the internal combustion engine 2, which requires a large amount of lubricating oil for the first and second friction plates 17, 19 placed in the air, the clutch K0 can be engaged with a sufficient amount of lubricating oil being generated by the engine driven oil pump 80 by driving of the internal combustion engine 2. Thus, capability to cool the clutch K0 can be ensured.

Moreover, an increase in size of the electric oil pump can be prevented as compared to, e.g., the case where an electric oil pump is provided and the clutch K0 is cooled by the electric oil pump. This eliminates the need to secure a large amount of lubricating oil by the electric oil pump. Since an increase in size of the electric oil pump can be prevented, mountability on vehicles can be improved and cost reduction can be achieved.

The hybrid drive device 1 further includes the input-shaft cooperative oil pump 70 that is drivingly coupled to the input shaft 15 to generate an oil pressure to be supplied to the hydraulic control device 21. Thus, in particular, even during EV driving, the speed change mechanism 7 can be hydraulically controlled by the oil pressure that is generated by the input-shaft cooperative oil pump 70. Since the oil pressure required to hydraulically control the speed change mechanism 7 can be generated by the input-shaft cooperative oil pump 70, the oil pressure to be generated by the engine driven oil pump 80 can be reduced, and the engine driven oil pump 80 can be reduced in size.

On the contrary, during hybrid driving that requires a high oil pressure (an engagement pressure for the clutches and the brakes) for the speed change mechanism 7, the engine driven oil pump 80 is driven by the internal combustion engine 2. Thus, the speed change mechanism 7 need not be hydraulically controlled only by the oil pressure that is generated by the input-shaft cooperative oil pump 70. Namely, the oil pressure can be generated by both the input-shaft cooperative oil pump 70 and the engine driven oil pump 80, whereby the oil pressure to be generated by the input-shaft cooperative oil pump 70 can also be reduced, and the input-shaft cooperative oil pump 70 can also be reduced in size.

The engine driven oil pump 80 is positioned so as to overlap the motor 3 in the axial direction as viewed in the radial direction. Thus, the engine driven oil pump 80 can be placed so as to be accommodated on the inner peripheral side of the motor 3, and the hybrid drive device 1 can be made compact in the axial direction.

In the hybrid drive device 1, the communication holes 51c that allow the space S1 included in the clutch housing 50 to communicate with the internal space S2 of the housing case 26 are merely formed in the clutch housing 50. Thus, the circulation type clutch K0 that circulates the lubricating oil in an oil-tight manner can be easily changed to the structure in which the space S1 included in the clutch housing 50 is open to the atmosphere in the internal space S2 of the housing case 26.

Second Reference Example

Figure 3:
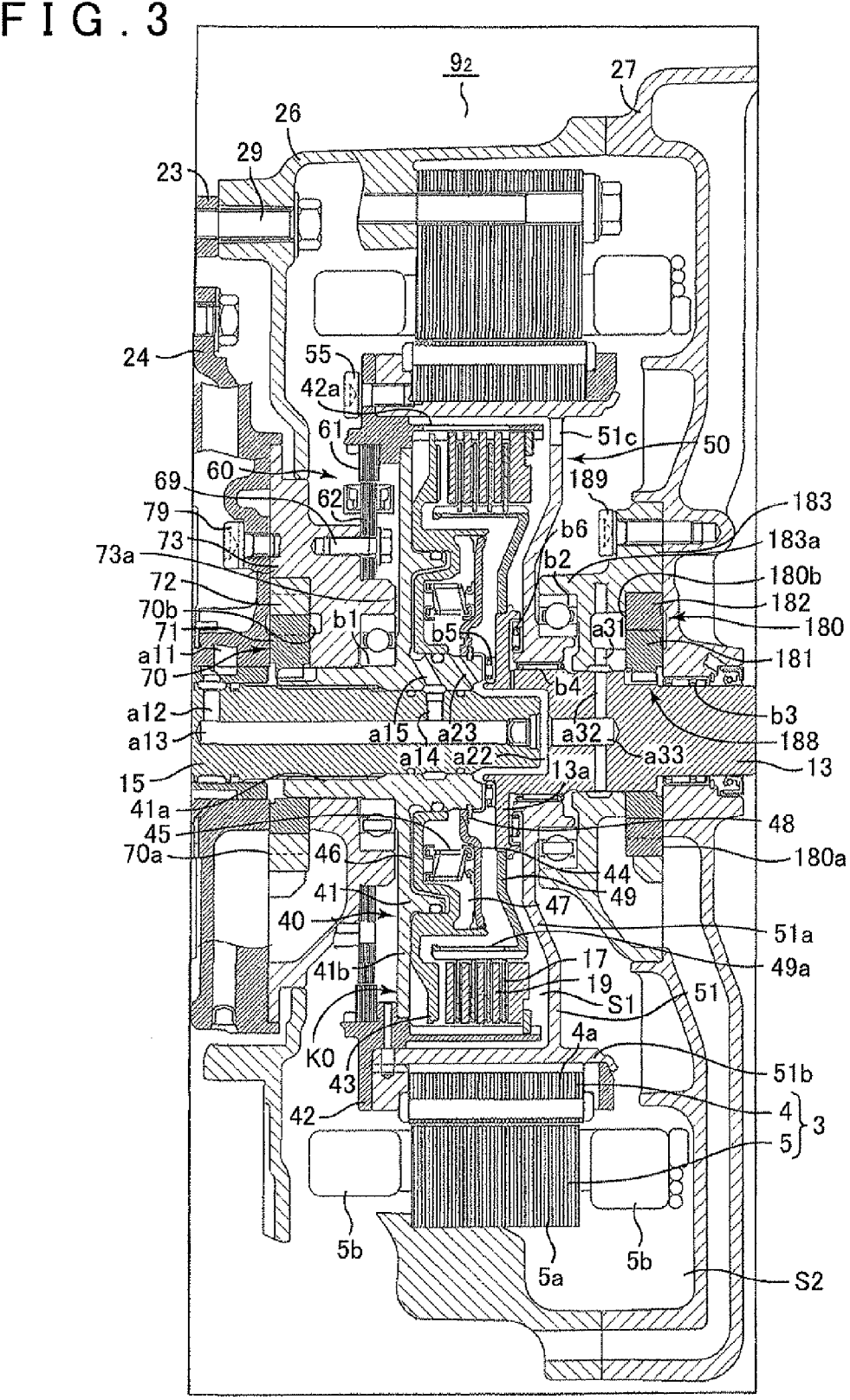
FIG. 3 is a sectional view showing an input portion $9_2$ according to a second reference example.

A second reference example, which is obtained by partially changing the first reference example, will be described with reference to FIG. 3. In the description of the second reference example, portions similar to those of the first reference example are denoted by the same reference characters, and description thereof will be omitted.

An input portion $9_2$ of the hybrid drive device 1 of the second reference example is different from the first reference example in the structure of the oil pressure discharge path of the engine driven oil pump. Specifically, as shown in FIG. 3, an engine driven oil pump 180 is provided on the outer periphery of the engine coupling shaft 13 so as to be located between the internal combustion engine 2 (the connection portion 14) and the clutch K0 in the axial direction, and to be located on the inner peripheral side of the coil end 5b on the internal combustion engine 2 side of the motor 3, like the engine driven oil pump 80 of the first reference example.

The engine driven oil pump 180 has a drive gear 181 and a driven gear 182 which form an internal gear oil pump, and has a pump body 183 accommodating the drive gear 181 and the driven gear 182. The engine driven oil pump 180 is formed by fastening the pump body 183 to the partition wall 27 by a bolt 189 so that the partition wall 27 closing the housing case 26 serves as a cover closing the gear accommodating portion of the pump body 183. The pump body 183 supports the ball bearing b2 by a support portion 183a, and rotatably supports the rotor hub 51 and the engine coupling shaft 13.

Like the first reference example, the drive gear 181 of the engine driven oil pump 180 is drivingly coupled to the outer periphery of the engine coupling shaft 13. More specifically, this driving coupling is implemented by a coupling structure 188 formed by engaging a key formed on the inner peripheral side of the drive gear 181 with a key groove formed in the engine coupling shaft 13. That is, the engine driven oil pump 180 is placed so that it can be drivingly coupled to the transmission path $L_1$ located on the internal combustion engine 2 side of the clutch K0 (see FIG. 1).

The engine driven oil pump 180 thus drivingly coupled to the engine coupling shaft 13 is driven by the driving forces of the motor 3 and the internal combustion engine 2 or by the inertial force of the vehicle via the speed change mechanism 7 when in the coast state (when the engine brake is in operation) during hybrid driving. In particular, when starting the vehicle from its stopped state by the driving force of the internal combustion engine 2 while slip engaging the clutch K0, the engine driven oil pump 180 is driven by the driving force of the internal combustion engine 2 from before engagement of the clutch K0 (i.e., from when the vehicle is in the stopped state).

When driven, the engine driven oil pump 180 according to the second reference example sucks oil from an input port 180a communicating with the oil pan, not shown, and generates an oil pressure from a discharge port 180b, even while the vehicle is stopped. The oil pressure discharged from the discharge port 180b is supplied from a lubricating oil passage a31, which is formed in the pump body 183 so as to directly communicate with the discharge port 180b, through lubricating oil passages a32, a33 formed in the engine coupling shaft 13 to the lubricating oil passage a22 formed by the gap between the engine coupling shaft 13 and the input shaft 15, and is supplied to the cancelling oil chamber 47 via the lubricating oil passage a23 formed in the boss portion 41a of the cylinder member 41. The lubricating oil that has overflown the cancelling oil chamber 47 flows from the thrust bearing b5 through the through hole 49a of the clutch hub 49, and is scattered to the inner friction plates 17 and the outer friction plates 19, thereby lubricating and cooling the inner friction plates 17 and the outer friction plates 19.

Accordingly, when starting the vehicle by the driving force of the internal combustion engine 2, a large amount of lubricating oil required in the slip engaged state when starting the vehicle is not supplied to the lubricating oil passage via the hydraulic control device 21 by using the oil pressure generated by the electric oil pump, not shown, but is supplied from the engine driven oil pump 180 directly to the inner friction plates 17 and the outer friction plates 19 without via the hydraulic control device 21.

According to the hybrid drive device 1 of the second reference example configured as described above, the engine driven oil pump 180 is dedicated to generating the oil pressure to be supplied to the lubricating oil passage. This can reduce the size of the engine driven oil pump 180, can reduce the drag resistance of the engine driven oil pump 180 during hybrid driving using the driving force of the internal combustion engine 2, and can improve fuel economy of the vehicle.

Since the engine driven oil pump 180 is dedicated to generating the oil pressure to be supplied to the lubricating oil passage, the generated oil pressure is low, and the seal structure between the pump body 183 and the partition wall 27 can be simplified, and the engine driven oil pump 180 can be made compact.

The lubricating oil passages a31 to a33 are connected to the discharge port 180b of the engine driven oil pump 180 without via the hydraulic control device 21. That is, this can eliminate the need for an oil passage leading from the engine driven oil pump 180 to the center side of the clutch K0 (e.g., the input shaft 15) via the hydraulic control device 21, and thus can simplify the hybrid drive device 1 and can achieve cost reduction, etc. Since the clutch K0 is not engaged during EV driving, the clutch K0 need not be lubricated, and all the oil passages that are used to supply the lubricating oil from the hydraulic control device 21 to the center side of the clutch K0 (e.g., the input shaft 15) can be eliminated.

Since the configuration, operation, and effects of the hybrid drive device 1 according to the second reference example are otherwise similar to those of the first reference example, description thereof will be omitted.

First Embodiment

A first embodiment, which is obtained by partially changing the first reference example, will be described with reference to FIG. 4. In the description of the first embodiment, portions similar to those of the first reference example are denoted by the same reference characters, and description thereof will be omitted.

An input portion $9_3$ of the hybrid drive device 1 of the first embodiment is different from the first reference example in that the input-shaft cooperative oil pump 70 is eliminated and in that the structure of the engine driven oil pump is changed so that an engine driven oil pump 280 can be driven by either the internal combustion engine 2 or the motor 3.

Figure 2:
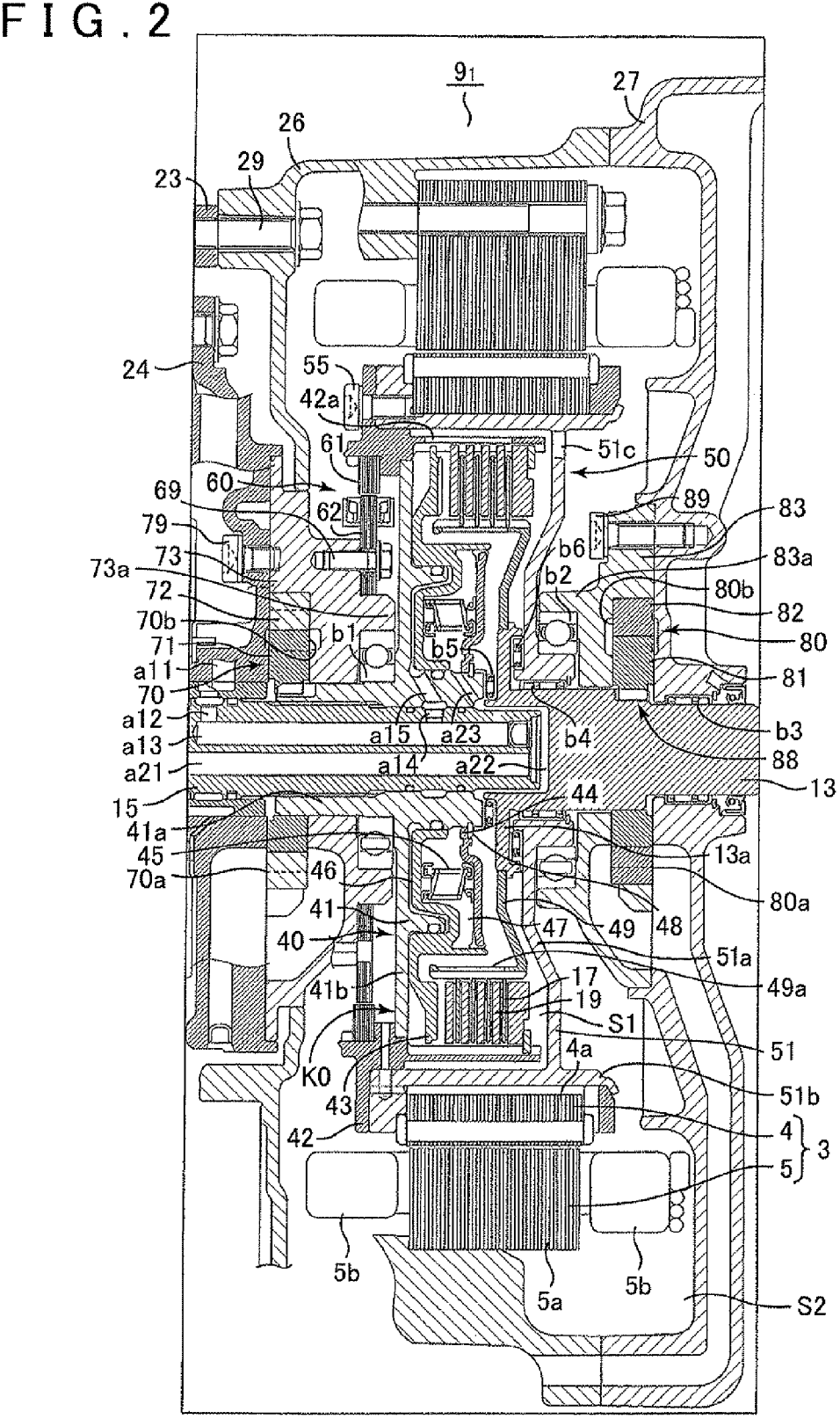
FIG. 2 is a sectional view showing an input portion $9_1$ according to a first reference example.
Figure 4:
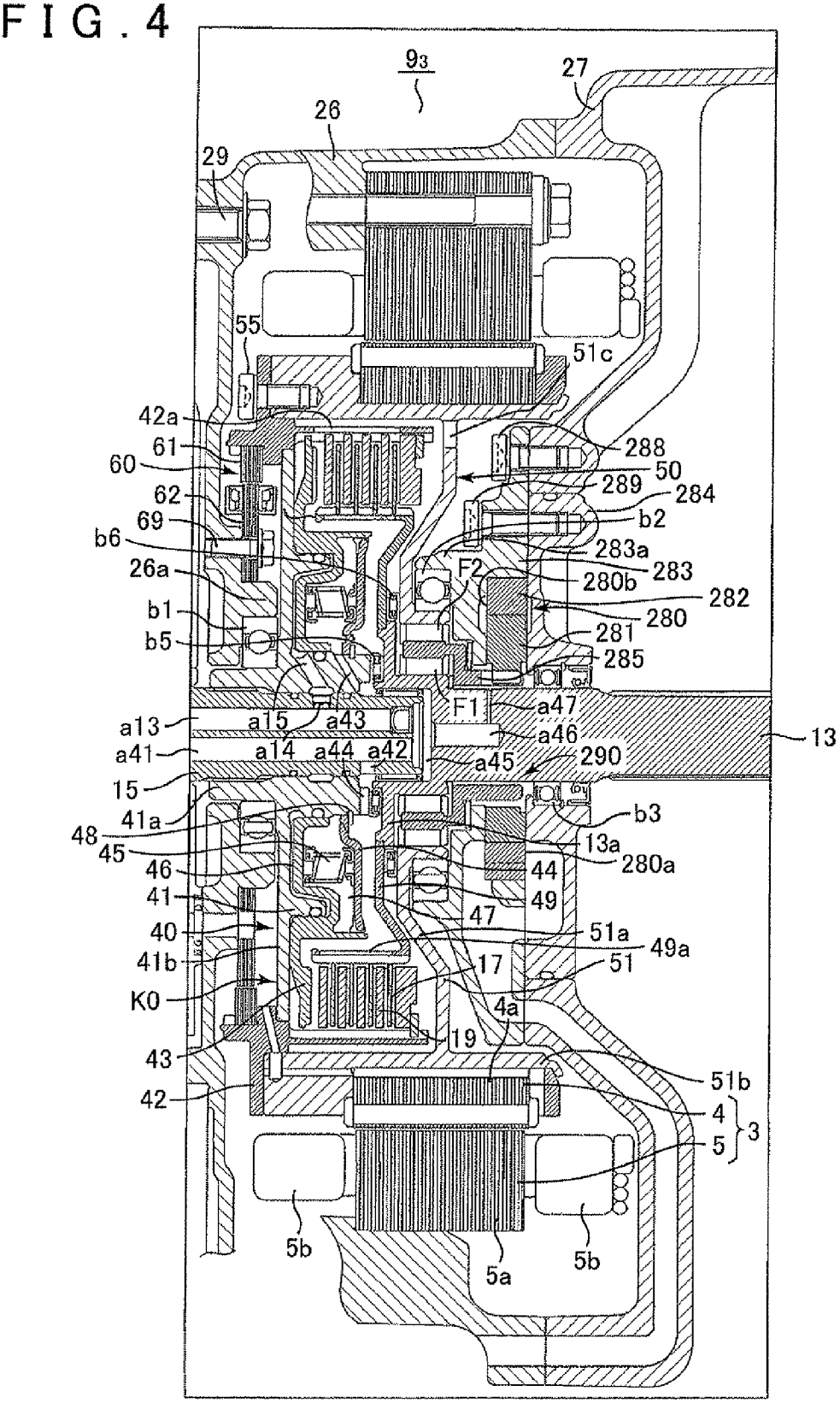
FIG. 4 is a sectional view showing an input portion $9_3$ according to a first embodiment.

Specifically, as shown in FIG. 4, the input-shaft cooperative oil pump 70 is eliminated in the input portion $9_3$ as compared to the first reference example (see FIG. 2). Thus, a support portion 26a supporting the ball bearing b1 is formed in a wall-like portion on the speed change mechanism 7 side of the housing case 26, so that the housing case 26 directly rotatably supports the cylinder member 41 and the input shaft 15. The stator 62 of the resolver 60 is fixed to the housing case 26 by the bolt 69.

On the other hand, in the input portion $9_3$, the engine driven oil passage 280 is provided on the outer periphery of the engine coupling shaft 13 so as to be located between the internal combustion engine 2 (the connection portion 14) and the clutch K0 in the axial direction, and to be located on the inner peripheral side of the coil end 5b on the internal combustion engine 2 side of the motor 3.

The engine driven oil pump 280 has a drive gear 281 and a driven gear 282 which form an internal gear oil pump, and has a pump body 283 accommodating the drive gear 281 and the driven gear 282, and a pump cover 284. The engine driven oil pump 280 is formed by fastening the pump body 283 to the pump cover 284 by a bolt 289 so that the pump cover 284 closes the gear accommodating portion of the pump body 283.

An outer edge portion of the pump body 283 is fastened to the partition wall 27 by a bolt 288, so that the engine driven oil pump 280 is fixed to and supported by the partition wall 27 and the housing case 26. Thus, the pump body 283 supports the ball bearing b2 by a support portion 283a, and rotatably supports the rotor hub 51 and the engine coupling shaft 13.

The drive gear 281 of the engine driven oil pump 280 is drivingly coupled to a coupling member 285 rotatably placed on the outer peripheral side of the engine coupling shaft 13. Specifically, this driving coupling is implemented by engaging a key formed on the inner peripheral side of the drive gear 281 with a key groove formed in the coupling member 285. A first one-way clutch F1 is provided on the inner peripheral side of the rear end side (the speed change mechanism 7 side) of the coupling member 285 so as to be interposed between the coupling member 285 and the engine coupling shaft 13. A second one-way clutch F2 is provided on the outer peripheral side of the rear end side (the speed change mechanism 7 side) of the coupling member 285 so as to be interposed between the coupling member 285 and the rotor hub 51. That is, the coupling member 285, the first one-way clutch F1, and the second one-way clutch F2 form a coupling structure 290 that couples the engine coupling shaft 13 to the engine driven oil pump 280.

Namely, when rotation of the engine coupling shaft 13 (i.e., the internal combustion engine 2) becomes lower than rotation of the coupling member 285, the first one-way clutch F1 is not engaged. When the rotation of the coupling member 285 becomes equal to the rotation of the engine coupling shaft 13, the first one-way clutch F1 is engaged, and the engine driven oil pump 280 is drivingly coupled to the internal combustion engine 2, and is driven by the driving force of the internal combustion engine 2. When rotation of the rotor hub 51 (i.e., the motor 3) becomes lower than rotation of the coupling member 285, the second one-way clutch F2 is not engaged. When the rotation of the coupling member 285 becomes equal to the rotation of the rotor hub 51, the second one-way clutch F2 is engaged, and the engine driven oil pump 280 is drivingly coupled to the motor 3, and is driven by the driving force of the motor 3.

That is, the engine driven oil pump 280 is placed so that it can be drivingly coupled to the transmission path $L_1$ located on the internal combustion engine 2 side of the clutch K0, and so that it can be drivingly coupled to the transmission path $L_2$ located on the speed change mechanism 7 side of the clutch K0 (see FIG. 1). When the clutch K0 is engaged, the transmission path $L_1$ is drivingly coupled to the transmission path $L_2$, whereby rotation of the internal combustion engine 2 becomes equal to rotation of the motor 3, and the engine driven oil pump 280 is driven by this rotation.

The engine driven oil pump 280, which is thus drivingly coupled to the engine coupling shaft 13 via the first one-way clutch F1 or is drivingly coupled to the rotor hub 51 via the second one-way clutch F2, is driven by the driving force of the motor 3 or by the inertial force of the vehicle via the speed change mechanism 7 when in the coast state (when the engine brake is in operation) during EV driving, and is driven by the driving forces of the motor 3 and the internal combustion engine 2 or by the inertial force of the vehicle via the speed change mechanism 7 when in the coast state (when the engine brake is in operation) during hybrid driving.

When starting the vehicle from its stopped state by the driving force of the internal combustion engine 2 while slip engaging the clutch K0, the first one-way clutch F1 is engaged from before engagement of the clutch K0 (i.e., from when the vehicle is in the stopped state), and thus the engine driven oil pump 280 is driven by the driving force of the internal combustion engine 2.

When driven in this manner, the engine driven oil pump 280 sucks oil from an input port 280a communicating with the oil pan, not shown, and generates an oil pressure from a discharge port 280b, even while the vehicle is stopped. The oil pressure thus generated is supplied to the hydraulic control device 21 through the oil passage formed in the partition wall 27, etc. Accordingly, when starting the vehicle by the driving force of the internal combustion engine 2, not only the oil pressure of the electric oil pump, not shown, but also the oil pressure of the engine driven oil pump 280 are applied. Thus, the lubrication pressure, which is used to supply a large amount of lubricating oil required in the slip engaged state when starting the vehicle, can be generated not only by the electric oil pump but also by the engine driven oil pump 280.

A lubrication pressure generated by the hydraulic control device 21 based on the oil pressure generated by the engine driven oil pump 280 or the electric oil pump, not shown, is supplied from an oil passage in the partition wall 24, not shown, through lubricating oil passages a41, a42 formed in the input shaft 15 to the canceling oil chamber 47 through a lubricating oil passage a43 formed in the boss portion 41a of the cylinder member 41. The lubricating oil that has overflown the cancelling oil chamber 47 or the lubricating oil that has passed through an oil passage a44 flows from the thrust bearing b5 through the through hole 49a of the clutch hub 49, and is scattered to the inner friction plates 17 and the outer friction plates 19, thereby lubricating and cooling the inner friction plates 17 and the outer friction plates 19. That is, the lubricating oil passages a41 to a44 are oil passages that are used to scatter the lubricating oil from the center side of the clutch K0 to lubricate the clutch K0.

The lubricating oil supplied from the lubricating oil passage a41 formed in the input shaft 15 to a lubricating oil passage a45 formed by the gap between the engine coupling shaft 13 and the input shaft 15 is guided to the inner peripheral side of the coupling member 285 through oil passages a46, a47 formed in the engine coupling shaft 13, thereby lubricating the first one-way clutch F1 and lubricating the second one-way clutch F2 and the ball bearing b2 through the key groove of the coupling member 285.

The hybrid drive device 1 of the first embodiment configured as described above includes the engine driven oil pump 280 that generates an oil pressure to be supplied to the first lubricating oil passage, which is used to supply the lubricating oil to the first and second friction plates 17, 19 placed in air, by the driving force of the internal combustion engine 2 regardless of engagement or disengagement of the clutch K0. Accordingly, drag of the clutch K0 can be reduced as compared to, e.g., the case where lubricating oil is circulated in a case in which the first friction plates 17 and the second friction plates 19 are hermetically sealed. Moreover, especially when starting the vehicle by using the driving force of the internal combustion engine 2, which requires a large amount of lubricating oil for the first and second friction plates 17, 19 placed in the air, the clutch K0 can be engaged with a sufficient amount of lubricating oil being generated by the engine driven oil pump 280 by driving of the internal combustion engine 2. Thus, capability to cool the clutch K0 can be ensured.

Moreover, an increase in size of the electric oil pump can be prevented as compared to, e.g., the case where an electric oil pump is provided and the clutch K0 is cooled by the electric oil pump. This eliminates the need to secure a large amount of lubricating oil by the electric oil pump. Since an increase in size of the electric oil pump can be prevented, mountability on vehicles can be improved and cost reduction can be achieved.

Moreover, the engine driven oil pump 280 can be rotated by the driving force of the internal combustion engine 2 via the first one-way clutch F1 during hybrid driving using the driving force of the internal combustion engine 2, and can be rotated by the driving force of the motor 3 via the second one-way clutch F2 during EV driving using the driving force of the motor 3. This can eliminate the need for, e.g., the input-shaft cooperative oil pump 70, whereby the hybrid drive device 1 can be made compact, and cost reduction can be achieved.

Since the control portion 20 is provided which controls the hydraulic control device 21 so as to supply the oil pressure generated by the engine driven oil pump 280 to the clutch K0 while the clutch K0 is slipped. Thus, capability to cool the clutch K0 can be ensured even when the clutch K0 is in the slipped state.

Since the configuration, operation, and effects of the hybrid drive device 1 according to the first embodiment are otherwise similar to those of the first reference example, description thereof will be omitted.

Second Embodiment

A second embodiment, which is obtained by partially changing the first embodiment, will be described with reference to FIG. 5. In the description of the second embodiment, portions similar to those of the first embodiment are denoted by the same reference characters, and description thereof will be omitted.

An input portion $9_4$ of the second embodiment is different from the first embodiment in that the first one-way clutch F1 and the second one-way clutch F2 are extended in the axial direction in order to increase their torque capacity. An angular ball bearing 90 is placed in the resultant axially relatively long space formed on the outer peripheral side of the first and second one-way clutches F1, F2, so that the rotor hub 51 of the motor 3 is rotatably supported with respect to a pump body 383 of an engine driven oil pump 380 by the angular ball bearing 90.

The rotor 4 is thus supported with relatively high accuracy by the angular ball bearing 90. This eliminates the need to support the rotor 4 by the clutch drum of the clutch K0, namely the need for the double-supported structure, and thus eliminates the need for such a support structure of the rotor hub 51 by the cylinder member 41 and the drum member 42 as in the first embodiment. Accordingly, the cylinder member 41 need not be supported with respect to the housing case 26 (see FIG. 4), and the partition wall of the housing case 26 can be eliminated, whereby the hybrid drive device 1 can be made compact in the axial direction.

The input portion $9_4$ according to the second embodiment will be described below with reference to FIG. 5. The engine coupling shaft 13 that is connected to the internal combustion engine 2 via the damper 12 of the connection portion 14, and the input shaft 15 of the speed change mechanism 7 are coaxially arranged on the center side of the housing case 26. The engine coupling shaft 13 has a recessed portion 13*b* formed in its end located on the opposite side from the engine 2, so that the recessed portion 13*b* has its central portion recessed toward the engine 2. The tip end on the engine 2 side of the input shaft 15 is inserted in the recessed portion 13*b*. That is, the tip end of the input shaft 15 is fitted in the recessed portion 13*b*, so that the engine coupling shaft 13 and the input shaft 15 are rotatable relative to each other and form a single shaft shape. The outer peripheral surface of the input shaft 15 and the recessed portion 13*b* of the engine coupling shaft 13 are sealed by a seal ring (seal member) d1 buried in the circumferential direction in the outer peripheral surface of the input shaft 15. The oil passage structure will be described in detail later.

The engine coupling shaft 13 is rotatably supported with respect to the partition wall 27 by a ball bearing b3, and is rotatably supported with respect to the partition wall 27 via a support member 386, which is fixed to the pump body 383 fixed to the partition wall 27 and described in detail below, the angular ball bearing 90, a sleeve portion 51*d* of the rotor hub 51, and a coupling mechanism 390 of the engine driven oil pump 380. The coupling mechanism 390 of the engine driven oil pump 380 is formed by a coupling member 385 coupled to a drive gear 381 of the engine driven oil pump 380, the one-way clutch F2 placed between the sleeve portion 51*d* of the rotor hub 51 and the coupling member 385 and needle bearings b23, b24 placed at both ends of the one-way clutch F2, and the one-way clutch F2 placed between the engine coupling member 13 and the coupling member 385 and needle bearings b21, b22 placed at both ends of the one-way clutch F1.

The input shaft 15 is rotatably supported by a needle bearing b13 with respect to a sleeve-like member 25 provided on the inner periphery of a boss portion 24*a* formed on the inner peripheral side of the partition wall 24 fixed to the transmission case 23 (see FIG. 2).

The flange portion 13*a* is formed at the rear end on the speed change mechanism 7 side of the engine coupling shaft 13. A clutch hub 149, with which the plurality of inner friction plates 17 of the clutch K0 are spline engaged, are fixedly attached to the flange portion 13*a*. That is, the inner friction plates 17 are drivingly coupled to the engine coupling shaft 13.

The clutch K0 generally has the plurality of inner friction plates 17, the outer friction plates 19 arranged alternately with the inner friction plates 17, and a hydraulic servo 140 that performs engagement/disengagement of (engages or disengages) the inner friction plates 17 and the outer friction plates 19. The hydraulic servo 140 has a cylinder member 141 forming a hydraulic cylinder of the hydraulic servo 140, drivingly coupled to the input shaft 15 by spline engagement, and rotatably supported by the boss portion 24*a*, a drum member 142 fixedly attached to the outer peripheral side of a flange portion 141*b* of the cylinder member 141, a piston 143 placed so as to be axially movable with respect to the cylinder member 141 and placed so that its tip end faces the outer friction plate 19 (or the inner friction plate 17), a return plate 144 positioned with respect to a boss portion 141*a* of the cylinder member 141 by a snap ring 148, and a return spring 145 provided in a compressed manner between the piston 143 and the return plate 144. A hydraulic oil chamber 146 is formed between the cylinder member 141 and the piston 143, and a canceling oil chamber 147 that cancels a centrifugal oil pressure is formed between the piston 143 and the return plate 144.

The cylinder member 141 and the drum member 142 form an integral clutch drum, and the plurality of outer friction plates 19 are spline engaged with the inner side of the drum member 142. That is, the outer friction plates 19 are drivingly coupled to the input shaft 15 via the drum member 142 and the cylinder member 141. Splines 142*s* are formed on the outer peripheral side of the drum member 142 forming the clutch drum, and are spline engaged with splines 51*s* of the rotor hub 51 described in detail below. That is, the rotor 4 of the motor 3 is drivingly coupled to the input shaft 15 via the clutch drum of the clutch K0. The boss portion 141*a* of the cylinder member 141 is rotatably positioned in the axial direction by thrust bearings b14, b15 between the boss portion 24*a* of the partition wall 24 and the flange portion 13*a* of the engine coupling shaft 13.

The drum member 142 of the clutch drum of the clutch K0 is open to the engine 2 side in the axial direction, and a through hole 142*a* is formed in the drum member 142 so as to at least partially overlap the outer friction plate 19 as viewed in the radial direction. The lubricating oil flowing from a through hole 149*a* formed in the clutch hub 149 flows between the inner and outer friction plates 17, 19 to lubricate and cool the inner and outer friction plates 17, 19, and is discharged from the through hole 142*a* (part of the lubricating oil is discharged from the open side of the drum member 142) into the housing case 26. That is, the clutch K0 is a wet multi-plate clutch in which the inner friction plates 17 and the outer friction plates 19 are not made oil-tight (non-oil-tight) and are open to the atmosphere in the housing case 26 so that the inner friction plates 17 and the outer friction plates 19 are arranged in air. A wall-like portion 26*b* surrounding the coil end 5*b* described below is formed in the housing case 26, so that the lubricating oil that has cooled the clutch K0 is prevented from directly contacting the coil end 5*b*.

The stator 5 of the motor 3 is fixed between the outer peripheral side of the clutch K0 and the inner peripheral side of the housing case 26 by fastening the stator 5 to the partition wall 27 fixed to the housing case 26 by using a bolt 99. The stator 5 has the stator core 5*a*, and the coil ends 5*b*, 5*b* forming looped portions of a coil wound around the stator core 5*a* and protruding on both axial sides of the stator core 5*a*. The rotor 4 of the motor 3 is placed so as to face the inner peripheral side of the stator core 5*a* with a predetermined gap therebetween. Since the stator 5 is fixed to the partition wall 27, the stator 5 is satisfactory as a support structure with the rotor 4 rotatably supported by the partition wall 27. In this case, the number of locations for fixing a part is reduced by one as compared to the case where, e.g., the stator 5 is fixed to the housing case 26. Thus, the support accuracy of the stator 5 and the rotor 4 is improved.

The rotor hub 51 supporting the rotor 4 has the drum-shaped holding portion 51*b* that grips and holds the rotor core 4*a* of the rotor 4, the flange-shaped support portion 51*a* that supports the holding portion 51*b*, and the sleeve portion 51*d* having a sleeve shape and connected to the inner peripheral side of the support portion 51*a*. The holding portion 51*b* and the support portion 51*a* are welded together, and the support portion 51*a* and the sleeve portion 51*d* are welded together, thereby forming the integral rotor hub 51. The angular ball bearing 90 formed by two ball bearings b11, b12 is fastened by a nut 393, whereby the sleeve portion 51*d* is rotatably supported with respect to the support member 386 fixed to the pump body 383. The support portion 51*a* is also supported in the axial direction by a thrust bearing b16 with respect to the clutch hub 149 welded to the flange portion 13a of the engine coupling shaft 13.

A retaining member 95 is placed between the thrust bearing b16 and the support portion 51a of the rotor hub 51 so as to be fitted in a through hole 51f. An outer peripheral portion of the retaining member 95 is bent toward the engine 2 so that the lubricating oil flowing from the inner peripheral side is guided to the angular ball bearing 90.

The support member 386 supporting the angular ball bearing 90 is configured as a separate member from the pump body 383 of the engine driven oil pump 380 described in detail below, and is placed so as to cover the outer peripheral side of the angular ball bearing 90. Since the support member 386 is thus configured as a separate member from the pump body 383, the set of the rotor hub 51, the angular ball bearing 90, and the support member 386 can be fixed to the pump body 383 after fastening the angular ball bearing 90 to the rotor hub 51 by a nut 392.

A rotor (exciting coil) 161 is fixedly attached to the inner peripheral side of the rotor hub 51 supporting the rotor 4 of the motor 3, and a stator (detection coil) 162 is fixedly attached to the outer peripheral side of the support member 386 by a bolt 169 so as to face the rotor 161. The rotor 161 and the stator 162 form a resolver 160 that detects rotation of the motor 3.

Specifically, when mounting the rotor hub 51, the rotor 161 of the resolver 160 is fixedly attached to the inner peripheral side of the rotor hub 51, and the stator 162 of the resolver 160 is fixedly attached to the outer peripheral side of the support member 386 by the bolt 169. The circumferential position of the bolt 169 that fixes the stator 162 of the resolver 160 is located in phase with a bolt 389 that fastens the pump body 383 and a pump cover 384.

Next, the ball bearing b12 is mounted to the support member 386 so as to contact a protruding portion 386b of the support member 386, the ball bearing b12 is fixed to the support member 386 by a snap ring 91, and the ball bearing b11 is mounted to the support member 386. Then, the rotor hub 51 is mounted to the inner peripheral side of the angular ball bearing 90, and is fastened by the nut 392. A protruding portion 386a formed on the engine 2 side of the support member 386 is fitted in the pump body 383 like a spigot joint, and a plurality of bolt holes 386c formed in the support member 386 are aligned with through holes 51e of the rotor hub 51 in the rotating direction. A plurality of bolts 391 are fixedly attached to the pump body 383 via the support member 386, whereby the support member 386 is mounted to the pump body 383. The number of through holes 51e of the rotor hub 51 may be one, or may be the same as the plurality of bolt holes 386c.

The structure of the engine driven oil pump 380 will be described below. The engine driven oil pump 380 is provided on the outer periphery of the engine coupling shaft 13 so as to be located between the internal combustion engine 2 (the connection portion 14) and the clutch K0 in the axial direction, and to be located on the inner peripheral side of the coil end 5b on the internal combustion engine 2 side of the motor 3.

The engine driven oil pump 380 has a drive gear 381 and a driven gear 382 which form an internal gear oil pump, and has the pump body 383 accommodating the drive gear 381 and the driven gear 382, and the pump cover 384. The engine driven oil pump 380 is formed by fastening the pump body 383 to the pump cover 384 by the bolt 389 so that the pump cover 384 closes the gear accommodating portion of the pump body 383. A hole 383a in which the bolt 389 is tightened is formed in the pump body 383. The hole 383a is formed in phase with the bolt 169 that fixes the stator 162 of the resolver 160 as described above.

An outer edge portion of the pump body 383 is fastened to the partition wall 27 by a bolt 388, so that the engine driven oil pump 380 is fixed to and supported by the partition wall 27 and the housing case 26. Thus, the pump body 383 supports the rotor hub 51 and the rotor 4 with high accuracy via the support member 386 and the angular ball bearing 90, and rotatably supports the engine coupling shaft 13 via the needle bearings b21, b22, b23, b24 and the coupling member 385 described in detail below.

The drive gear 381 of the engine driven oil pump 380 can be drivingly coupled to the engine coupling shaft 13 and the rotor hub 51 (i.e., the rotor 4) via the coupling mechanism 390. That is, the drive gear 381 of the engine driven oil pump 380 is drivingly coupled to the coupling member 385 rotatably placed on the outer peripheral side of the engine coupling shaft 13. Specifically, this driving coupling is implemented by engaging a key formed on the inner peripheral side of the drive gear 381 with a key groove formed in the coupling member 385. The first one-way clutch F1 is provided on the inner peripheral side of the rear end side (the speed change mechanism 7 side) of the coupling member 385 so as to be interposed between the coupling member 385 and the engine coupling shaft 13. The second one-way clutch F2 is provided on the outer peripheral side of the rear end side (the speed change mechanism 7 side) of the coupling member 385 so as to be interposed between the coupling member 385 and the sleeve portion 51d of the rotor hub 51.

In the second embodiment, the axial lengths of the first and second one-way clutches F1, F2 are increased in order to increase the torque capacity of the first and second one-way clutches F1, F2. Moreover, the needle bearings b21, b22 are placed on both sides of the first one-way clutch F1 in the axial direction and the needle bearings b23, b24 are placed on both sides of the second one-way clutch F2 in the axial direction in order to achieve satisfactory tilting accuracy when the first and second one-way clutches F1, F2 are engaged. This improves rotation support accuracy of the engine coupling shaft 13 that is supported via the angular ball bearing 90 and the needle bearings b21, b22, b23, b24.

According to the coupling mechanism 390 thus configured, when rotation of the engine coupling shaft 13 (i.e., the internal combustion engine 2) becomes lower than rotation of the coupling member 385, the first one-way clutch F1 is not engaged. When the rotation of the coupling member 385 becomes equal to the rotation of the engine coupling shaft 13, the first one-way clutch F1 is engaged, and the engine driven oil pump 380 is drivingly coupled to the internal combustion engine 2, and is driven by the driving force of the internal combustion engine 2. When rotation of the rotor hub 51 (i.e., the motor 3) becomes lower than rotation of the coupling member 385, the second one-way clutch F2 is not engaged. When the rotation of the coupling member 385 becomes equal to the rotation of the rotor hub 51, the second one-way clutch F2 is engaged, and the engine driven oil pump 380 is drivingly coupled to the motor 3, and is driven by the driving force of the motor 3.

That is, the engine driven oil pump 380 is placed so that it can be drivingly coupled to the transmission path $L_1$ located on the internal combustion engine 2 side of the clutch K0, and so that it can be drivingly coupled to the transmission path $L_2$ located on the speed change mechanism 7 side of the clutch K0 (see FIG. 1). When the clutch K0 is engaged, the transmission path $L_1$ is drivingly coupled to the transmission path $L_2$, whereby rotation of the internal combustion engine 2 becomes equal to rotation of the motor 3, and the engine driven oil pump 380 is driven by this rotation.

The engine driven oil pump 380, which is thus drivingly coupled to the engine coupling shaft 13 via the first one-way clutch F1 or is drivingly coupled to the rotor hub 51 via the second one-way clutch F2, is driven by the driving force of the motor 3 or by the inertial force of the vehicle via the speed change mechanism 7 when in the coast state (when the engine brake is in operation) during EV driving, and is driven by the driving forces of the motor 3 and the internal combustion engine 2 or by the inertial force of the vehicle via the speed change mechanism 7 when in the coast state (when the engine brake is in operation) during hybrid driving.

When starting the vehicle from its stopped state by the driving force of the internal combustion engine 2 while slip engaging the clutch K0, the first one-way clutch F1 is engaged from before engagement of the clutch K0 (i.e., from when the vehicle is in the stopped state), and thus the engine driven oil pump 380 is driven by the driving force of the internal combustion engine 2.

When driven in this manner, the engine driven oil pump 380 sucks oil from an input port 380a communicating with the oil pan, not shown, and generates an oil pressure from a discharge port 380b, even while the vehicle is stopped. The oil pressure thus generated is supplied to the hydraulic control device 21 through an oil passage formed in the partition wall 27, etc. Accordingly, when starting the vehicle by the driving force of the internal combustion engine 2, not only the oil pressure of the electric oil pump, not shown, but also the oil pressure of the engine driven oil pump 380 are applied. Thus, the lubrication pressure, which is used to supply a large amount of lubricating oil required in the slip engaged state when starting the vehicle, can be generated not only by the electric oil pump but also by the engine driven oil pump 380.

Various oil passage structures in the input portion $9_4$ will be described below with reference to FIGS. 5 and 6. As shown in FIG. 5, the engagement pressure of the clutch K0, which is supplied from the hydraulic control device 21 through the partition wall 24, flows from an oil passage a51 of the sleeve-like member 25 and through an oil passage a52 of the boss portion 24a, and communicates with the hydraulic oil chamber 146 via an oil passage a53 of the cylinder member 141 of the clutch drum.

When the engagement pressure is supplied from the hydraulic control device 21 to the hydraulic oil chamber 146 of the hydraulic servo 140 through the oil passages a51, a52 formed in the partition wall 24 and the sleeve-like member 25 and the oil passage a53 formed in the boss portion 141a of the cylinder member 141 based on a command of the control portion 20, the piston 143 moves forward in the axial direction against the biasing force of the return spring 145 to engage the inner friction plates 17 and the outer friction plates 19. Thus, the internal combustion engine 2 is drivingly coupled to the speed change mechanism 7, and the vehicle 100 is brought into a hybrid driving state where the vehicle 100 can travel by using the driving forces of the internal combustion engine 2 and the motor 3.

On the contrary, when the engagement pressure is discharged (drained) from the hydraulic oil chamber 146 of the hydraulic servo 140 through the oil passages a51 to a53 by the hydraulic control device 21 based on a command of the control portion 20, the piston 143 moves rearward in the axial direction based on the biasing force of the return spring 145 to disengage the inner friction plates 17 and the outer friction plates 19. Thus, the internal combustion engine 2 is disconnected from the speed change mechanism 7, and the vehicle 100 is brought into an EV driving state where the vehicle 100 can travel by using only the driving force of the motor 3.

In a portion not shown in the figure, the lubricating oil that lubricates the clutch K0 is supplied from the partition wall 24 through the sleeve-like member 25 to an oil passage (first oil passage) a61 formed in the axial direction in the input shaft 15. The oil passage a61 has its end closed on the engine 2 side of the input shaft 15. The oil passage a61 communicates with an oil passage a63 of the cylinder member 141 through a radial oil passage (second oil passage) a62 formed so as to extend through the input shaft 15, and communicates with the cancelling oil chamber 147.

The oil passage a61 is open to the outer peripheral side of the input shaft 15 through a radial oil passage a64 formed in the input shaft 15. The lubricating oil that is scattered from the oil passage a64 lubricates the thrust bearing b15 between the cylinder member 141 and the engine coupling shaft 13, and is guided radially inward of the clutch hub 149. The lubricating oil is further guided to the inner friction plates 17 and the outer friction plates 19 through the through hole 149a of the clutch hub 149. The lubricating oil that has lubricated the inner friction plates 17 and the outer friction plates 19 of the clutch K0 is discharged to the outside of the clutch K0 within the housing case 26 through the through hole 142a of the drum member 142 of the clutch drum. This lubricating oil is guided along the inner wall of the housing case 26 by the wall-like portion 26b so as not to contact the coil end 5b, and is collected by the oil pan, not shown.

In a portion not shown in the figure, the lubricating oil that lubricates the motor 3 is supplied from the partition wall 24 through the sleeve-like member 25 to an oil passage (third oil passage) a71 formed in the axial direction in the input shaft 15 so as to be parallel to the oil passage a61. The oil passage a71 has its end opened on the engine 2 side of the input shaft 15. The lubricating oil flows into an oil passage a72 in the recessed portion 13b of the engine coupling shaft 13, flows through an oil passage (fourth oil passage) a73 formed in the axial direction in the recessed portion 13b, and is discharged to the inner peripheral side of the coupling member 385 through an oil passage (fifth oil passage) a74 formed in the radial direction so as to extend through the engine coupling shaft 13.

Part of the lubricating oil discharged to the inner peripheral side of the coupling member 385 is guided to an oil passage a75 formed in the radial direction in the coupling member 385, and the remaining lubricating oil is guided to the needle bearing b22, the first one-way clutch F1, and the needle bearing b21. Since the oil passage a75 has a smaller sectional area (i.e., a smaller diameter) than the oil passage a74, an appropriate amount of the lubricating oil is directed from the oil passage a74 to the oil passage a75, and the remaining lubricating oil is guided to the needle bearing b22, the first one-way clutch F1, and the needle bearing b21.

Part of the lubricating oil that has passed through the oil passage a75 is also guided to the needle bearing b24, the second one-way clutch F2, and the needle bearing b23, and lubricates the needle bearing b24, the second one-way clutch F2, and the needle bearing b23. The lubricating oil that has lubricated the needle bearing b22, the first one-way clutch F1, and the needle bearing b21, and the lubricating oil that has lubricated the needle bearing b24, the second one-way clutch F2, and the needle bearing b23 are guided to the thrust bearing b16 provided at the tip end of the flange portion 13a of the engine coupling shaft 13, and are guided to the through hole 51f of the rotor hub 51 by the retaining member 95 described above, thereby lubricating the angular ball bearing 90.

The lubricating oil that has thus lubricated the angular ball bearing 90 and the lubricating oil that has been guided from the oil passage a75 to the outer peripheral side gather toward the lower side along the inner surface of the support member 386 held stationary, and are guided to the inside of the rotor hub 51 through a groove 386d formed on the lower side of the support member 386. The lubricating oil thus guided to the inside of the rotor hub 51 is directed in the axial direction by an oil passage a82 through an oil passage a81 formed in the rotor hub 51, and is supplied to both coil ends 5b, 5b from oil passages a83, a84, thereby cooling the motor 3.

A lubricating circuit that supplies lubrication in the hydraulic control device 21 will be described with reference to FIG. 6. As shown in FIG. 6, the hydraulic control device 21 that is controlled by the control portion 20 has an oil pressure supply source 400 that regulates the oil pressure generated by the engine driven oil pump 380 or the electric oil pump to a lubrication pressure (e.g., a secondary pressure etc.) by a regulator valve, not shown, etc. and outputs the lubrication pressure to an oil passage c1. The hydraulic control device 21 has oil passages c11 to c14 as the first lubricating oil passage that branches off from the oil passage c1 to connect to the oil passage a61 as a lubricating oil passage of the clutch K0, and an oil passage c21 as the second lubricating oil passage that branches off from the oil passage c1 to connect to the oil passage a71 as a lubricating oil passage of the motor 3. The first lubricating oil passage is provided with flow rate adjusting means 410 that adjusts the amount of lubricating oil. That is, the second lubricating oil passage branches off from the oil passage c1 at a position upstream of the flow rate adjusting means 410, and is not affected so much by the flow rate adjustment of the flow rate adjusting means 410 described in detail later.

Figure 5:
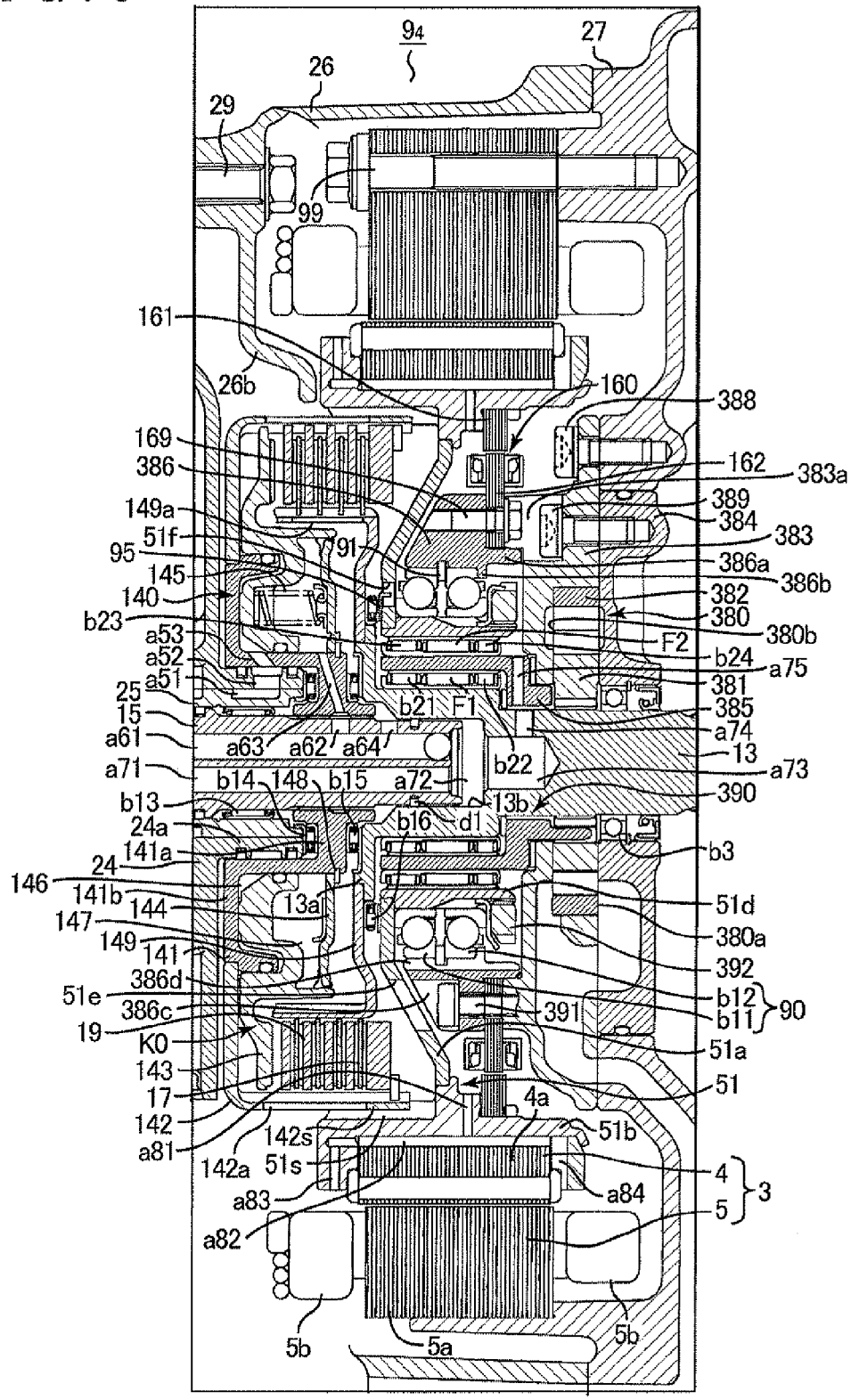
FIG. 5 is a sectional view showing an input portion $9_4$ according to a second embodiment.
Figure 6:
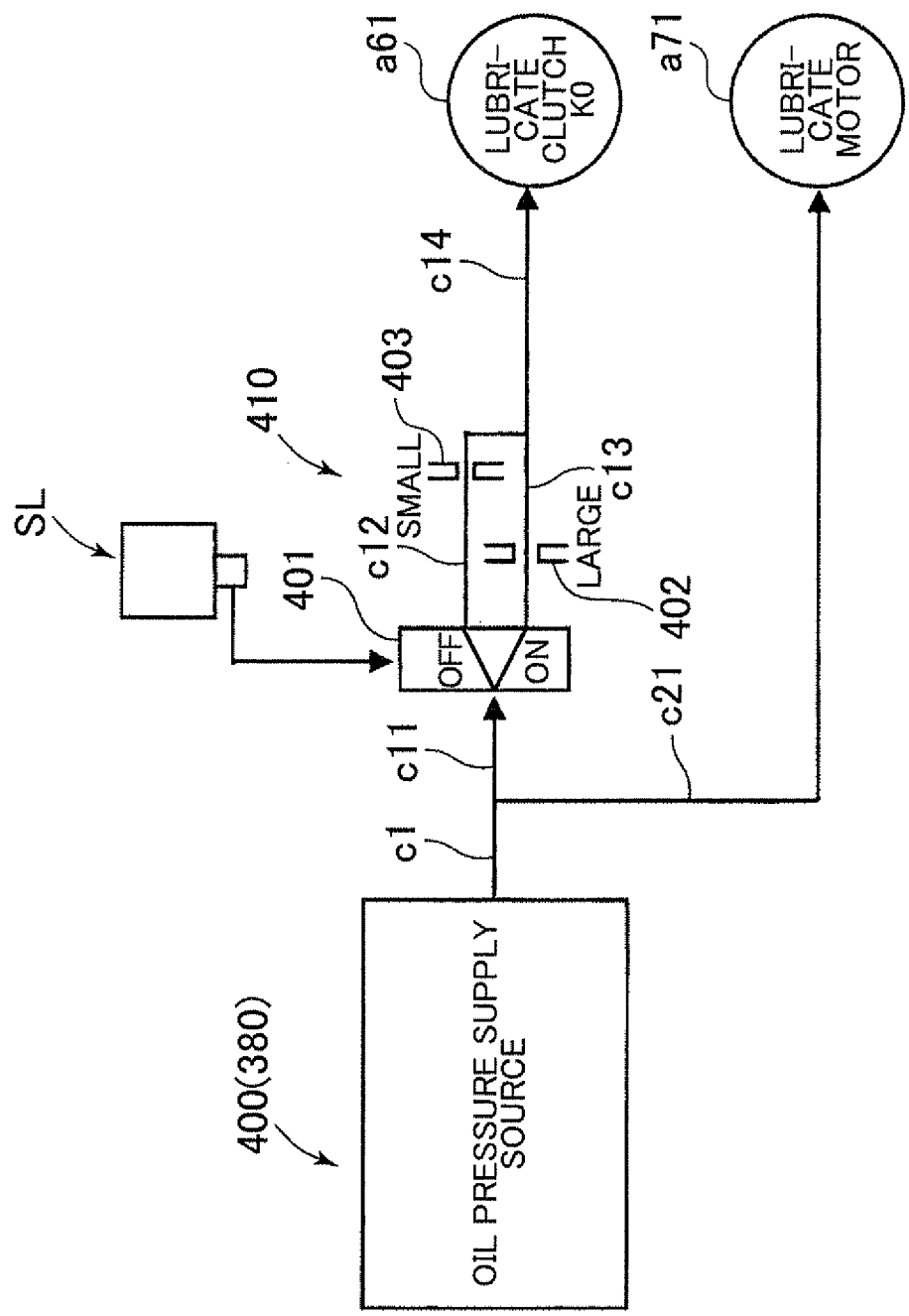
FIG. 6 is a diagram showing a lubricating circuit of a hydraulic control device.

In the present embodiment, the first lubricating oil passage is defined as an oil passage including the oil passages c11 to c14 branching off from the oil passage c1, and the oil passages a61 to a64 (see FIG. 5). The second lubricating oil passage is defined as an oil passage including the oil passage c21 branching off from the oil passage c1, the oil passages a71 to a75, and the oil passages a81 to a84 (see FIG. 5).

The flow rate adjusting means 410 has a solenoid valve SL that outputs an ON/OFF signal pressure, a switch valve 401 that is switched by the signal pressure, a small diameter orifice 403 provided in the oil passage c12, and a large diameter orifice 402 provided in the oil passage c13.

Accordingly, when, e.g., disengagement of the clutch K0 is performed or engagement of the clutch K0 is completed, and only a small amount of lubricating oil is required for the inner friction plates 17 and the outer friction plates 19, the solenoid valve SL is switched off according to a command of the control portion 20, and the switch valve 401 is switched to the OFF position, whereby the oil pressure supply source 400 communicates with the oil passage a61, which is located upstream of the lubricating oil passage of the clutch K0, through the path passing through the small diameter orifice 403, namely through the oil passages c1, c11, c12, c14. Thus, a sufficient small amount of lubricating oil is supplied to the clutch K0.

When, e.g., the operation of engaging the clutch K0 is being performed (during slipping), and a large amount of lubricating oil is required due to a large amount of heat generation of the inner friction plates 17 and the outer friction plates 19, the solenoid valve SL is switched on according to a command of the control portion 20, and the switch valve 401 is switched to the ON position, whereby the oil pressure supply source 400 communicates with the oil passage a61, which is located upstream of the lubricating oil passage of the clutch K0, through the path passing through the large diameter orifice 402, namely through the oil passages c1, c11, c13, c14. Thus, a large amount of lubricating oil is supplied to the clutch K0, and the clutch K0 is sufficiently cooled.

On the other hand, the oil passage c21 as the second lubricating oil passage is hardly affected by the flow rate adjustment of the flow rate control means 410. After branching off from the oil passage c1, the oil passage c21, the oil passages a71 to a75, and the oil passages a81 to a84 supply the lubricating oil to the motor 3 as a lubricating oil passage of another route without crossing the first lubricating oil passage (the oil passages c11 to c14, the oil passages a61 to a64). Thus, the motor 3 can be cooled with a stable amount of lubricating oil without being affected by heat generation of the clutch K0.

As described above, the hybrid drive device 1 of the second embodiment includes the engine driven oil pump 380 that generates an oil pressure to be supplied to the first lubricating oil passage, which is used to supply the lubricating oil to the first and second friction plates 17, 19 placed in air, by the driving force of the internal combustion engine 2 regardless of engagement or disengagement of the clutch K0. Accordingly, drag of the clutch K0 can be reduced as compared to, e.g., the case where lubricating oil is circulated in a case in which the first friction plates 17 and the second friction plates 19 are hermetically sealed. Moreover, especially when starting the vehicle by using the driving force of the internal combustion engine 2, which requires a large amount of lubricating oil for the first and second friction plates 17, 19 placed in the air, the clutch K0 can be engaged with a sufficient amount of lubricating oil being generated by the engine driven oil pump 380 by driving of the internal combustion engine 2. Thus, capability to cool the clutch K0 can be ensured.

Moreover, an increase in size of the electric oil pump can be prevented as compared to, e.g., the case where an electric oil pump is provided and the clutch K0 is cooled by the electric oil pump. This eliminates the need to secure a large amount of lubricating oil by the electric oil pump. Since an increase in size of the electric oil pump can be prevented, mountability on vehicles can be improved and cost reduction can be achieved.

The hybrid drive device 1 of the second embodiment is structured to include the clutch K0 formed by the inner friction plates 17 and the outer friction plates 19 which are placed so as to be open in the housing case 26, and further includes the engine driven oil pump 380 that generates an oil pressure to be supplied to the lubricating oil passage by the driving force of the internal combustion engine 2 regardless of engagement or disengagement of the clutch K0. Accordingly, especially when starting the vehicle by using the driving force of the internal combustion engine 2, which requires a large amount of lubricating oil for the inner and outer friction plates 17, 19 placed in the air, the clutch K0 can be engaged with a sufficient amount of lubricating oil being generated by the engine driven oil pump 380 by driving of the internal combustion engine 2. This eliminates the need to secure a large amount of lubricating oil by the electric oil pump, and prevents an increase in size of the electric oil pump, whereby mountability on vehicles can be improved and cost reduction can be achieved.

Since the second lubricating oil passage that supplies the lubricating oil to the motor 3 is provided, oil can be supplied to the motor 3 from the second lubricating oil passage independently of the first lubricating oil passage. Thus, oil can be supplied at a required flow rate to the clutch K0 without being affected by oil supply to the motor 3.

Moreover, the first lubricating oil passage is formed by the oil passage a61 and the oil passage a64, the second lubricating oil passage is formed by the oil passage a71, the oil passage a73, and the oil passage a74, and the seal ring d1 is placed between the input shaft 15 and the recessed portion 13b. This can prevent the first and second lubricating oil passages from crossing each other.

The engine driven oil pump 380 can be rotated by the driving force of the engine 2 via the first one-way clutch F1 during hybrid driving using the driving force of the engine 2, and can be rotated by the driving force of the motor 3 via the second one-way clutch F2 during EV driving using the driving force of the motor 3. This can eliminate the need for, e.g., the input-shaft cooperative oil pump, whereby the hybrid drive device can be made compact, and cost reduction can be achieved. Since the first one-way clutch F1 and the second one-way clutch F2 can be lubricated by the oil supplied from the second lubricating oil passages c21, a71 to a75, a required flow rate can be supplied to the clutch K0 without being affected by lubrication of the first one-way clutch F1 and the second one-way clutch F2. Moreover, the first one-way clutch F1 and the second one-way clutch F2 can be cooled with a stable amount of lubricating oil without being affected by heat generation of the clutch K0.

Moreover, the oil that has lubricated the first one-way clutch F1 and the second one-way clutch F2 is supplied to the motor 3. This can reduce the size of the engine driven oil pump 380 and the electric oil pump as compared to the case where a lubricating oil passage that is used to lubricate the first one-way clutch F1 and the second one-way clutch F2 is additionally provided independently of the first lubricating oil passage and the second lubricating oil passage.

Since the motor 3 is lubricated by the second lubricating oil passage c21, a71 to a75, a81 to a84 branched off from the first lubricating oil passage at a position upstream of the flow rate adjusting means 410, a required flow rate can be supplied to the clutch K0 without being affected by cooling of the motor 3. Moreover, the motor 3 can be cooled by the second lubricating oil passage that does not cross the first lubricating oil passage c11 to c14, a61 to a64, while being hardly affected by the flow rate adjustment of the flow rate adjusting means 410, and the motor 3 can be cooled with a stable amount of lubricating oil without being affected by heat generation of the clutch K0.

Moreover, the drum member 142 of the clutch drum of clutch K0 has the through hole 142a that is positioned so as to at least partially overlap the outer friction plate 19 as viewed in the radial direction and that discharges the oil supplied to the inner friction plates 17 and the outer friction plates 19. This allows a large amount of lubricating oil that has cooled the inner friction plates 17 and the outer friction plates 19 to be discharged and circulated in the housing case 26.

Since the control portion 20 is provided which controls the hydraulic control device 21 so as to supply the oil pressure generated by the engine driven oil pump 380 to the clutch K0 while the clutch K0 is slipped. Thus, capability to cool the clutch K0 can be ensured even when the clutch K0 is in the slipped state.

Third Embodiment

A third embodiment, which is obtained by partially changing the second embodiment, will be described with reference to FIG. 7. In the description of the third embodiment, portions similar to those of the second embodiment are denoted by the same reference characters, and description thereof will be omitted.

An input portion $9_5$ of the third embodiment is different from the second embodiment in that an engine driven oil pump 580 is placed on the outer periphery of the transmission case 23 so as to be located on the speed change mechanism 7 side of the motor 3 on an axis parallel to the engine coupling shaft 13. The stator 162 of the resolver 160 is not fixed to the support member 386 of the angular ball bearing 90 but to a cylindrical base portion 27a of the partition wall 27 by the bolt 169, and the support member 386 is fixed to the base portion 27a by the bolt 391.

Specifically, the coupling member 385 is placed so that it can be coupled to one of the engine coupling shaft 13 (i.e., the engine 2) and the rotor hub 51 (the motor 3), which has a higher rotational speed, via the first one-way clutch F1 and the second one-way clutch F2, and the axial tip end on the engine 2 side of the coupling member 385 is spline engaged with a sprocket 571 that is rotatably supported by the partition wall 27 via a ball bearing b31, and is drivingly coupled to the sprocket 571 in the rotating direction.

A chain 570 meshes with the sprocket 571, and a sprocket 572 meshing with the chain 570 is placed on an axis parallel to the sprocket 571. The sprocket 572 is rotatably supported by a ball bearing b32 with respect to the partition wall 27, and the inner peripheral side of the sprocket 572 is spline engaged with a transmission shaft 573 so that the sprocket 572 is drivingly coupled to the transmission shaft 573 in the rotating direction.

The transmission shaft 573 is placed so as to extend through a through hole 26c formed in the housing case 26. The transmission shaft 573 is rotatably supported by the partition wall 27 via the sprocket 572 and the ball bearing b32, and is rotatably supported by the partition wall 24 fixedly attached to the transmission case 23 via a ball bearing b33. That is, the transmission shaft 573 is rotatably supported by the double-supported structure.

The engine driven oil pump 580 of the third embodiment is a so-called internal gear pump, and has a drive gear 581 drivingly coupled to the transmission shaft 573, a driven gear 582 placed so as to mesh with the outer periphery of the drive gear 581, a pump body 587 covering the drive gear 581 and the driven gear 582 from the outer peripheral side, and a pump cover 584 closing the pump body 587. The pump body 587 is fixed to the partition wall 24 by a bolt 588, and the pump cover 584 is fixed to the partition wall 24 by a bolt 589 via the pump body 587.

The engine driven oil pump 580 is placed so as to be integrally fixed to the transmission case 23, and to protrude to the outside from a body portion of the transmission case 23. The engine driven oil pump 580 is preferably placed near the oil pan, not shown, and is preferably located below the input shaft 15. However, the engine driven oil pump 580 may be placed on a lateral side of the input shaft 15 or above the input shaft 15.

The first one-way clutch F1, the second one-way clutch F2, the coupling member 385, the sprocket 571, the chain 570, the sprocket 572, the transmission shaft 573, etc. described above form a transmission mechanism 590 capable of drivingly coupling the engine driven oil pump 580 to the engine coupling shaft 13 or the rotor hub 51.

In the engine driven oil pump 580 having the above structure, when the coupling member 385 is rotated by the engine coupling shaft 13 (the engine 2) or the rotor hub 51 (the motor 3) via the first one-way clutch F1 or the second one-way clutch F2, the drive gear 581 is rotated and driven via the sprocket 571, the chain 570, the sprocket 572, and the transmission shaft 573, and is rotated and driven together with the driven gear 582 meshing with the drive gear 581, and the engine driven oil pump 580 sucks oil from an input port 580a connected to the oil pan, and generates an oil pressure to discharge the oil pressure to an output port, not shown. The oil pressure thus generated, together with the oil pressure generated by the electric oil pump, not shown, serves as a source pressure of the oil pressure supply source 400 (see FIG. 6) of the hydraulic control device 21.

Figure 7:
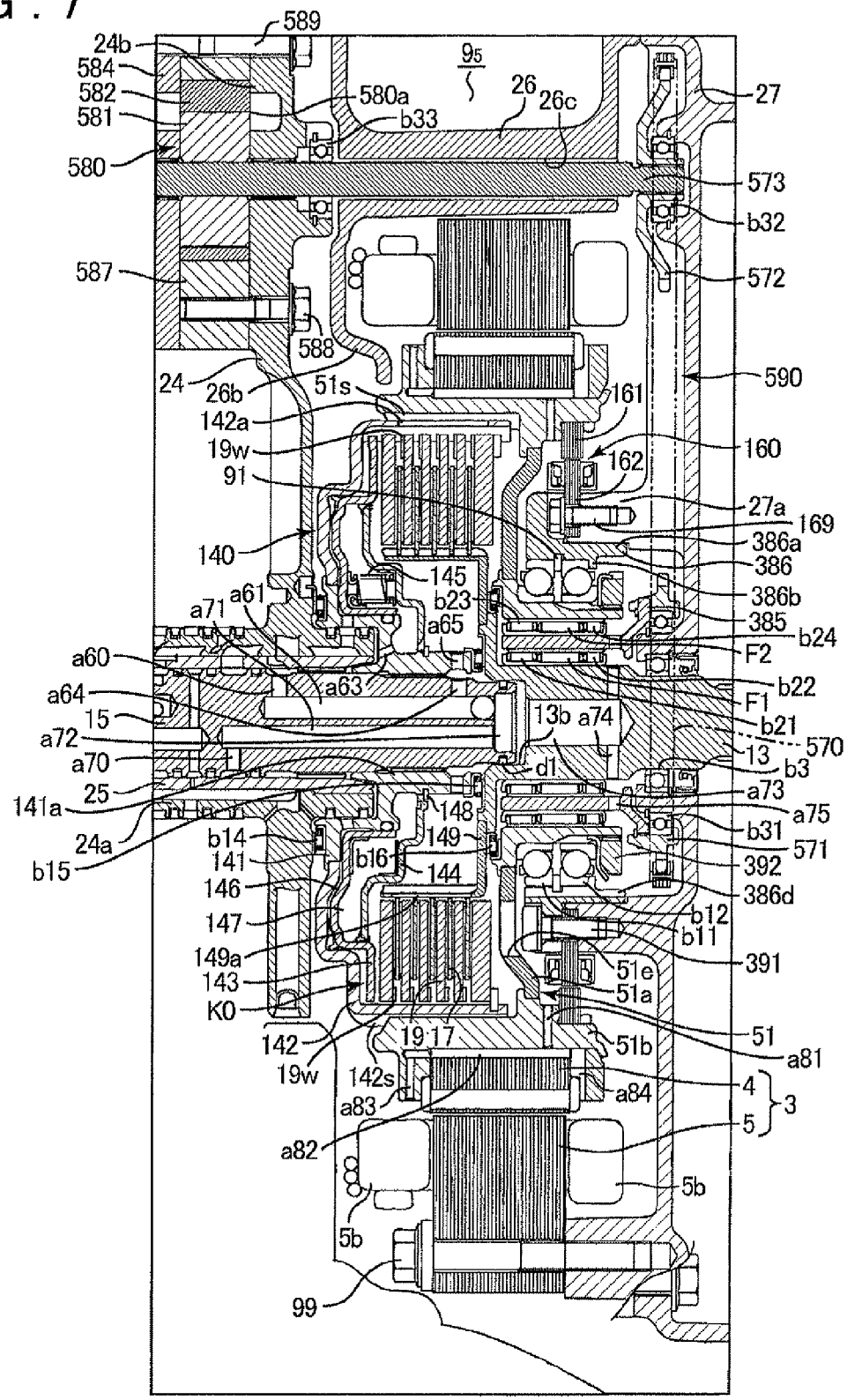
FIG. 7 is a sectional view showing an input portion $9_5$ according to a third embodiment.

As shown in FIG. 7, the lubricating oil that has passed through the first lubricating oil passage c11 to c14 from the oil pressure supply source 400 flows in the partition wall 24 and the sleeve-like member 25, is guided to an oil passage a60 of the input shaft 15, flows through the oil passages a61, a64 and through an oil passage a65 formed in the cylinder member 141 of the clutch K0, and is guided to the through hole 149a of the clutch hub 149 to cool the inner friction plates 17 and the outer friction plates 19. Then, this lubricating oil is discharged from the through hole 142a of the drum member 142 into the housing case 26, and is returned into the oil pan. The lubricating oil flows from an oil passage in the sleeve-like member 25 and between the sleeve-like member 25 and the input shaft 15, and is supplied to the oil passage a63 communicating with the cancelling oil chamber 147.

As shown in FIG. 7, the lubricating oil that has passed through the second lubricating oil passage c21 from the oil pressure supply source 400 flows in the partition wall 24 and the sleeve-like member 25, is guided to an oil passage a70 of the input shaft 15, flows through the oil passages a71 to a75, and is guided to the oil passage a81 through the groove 386d of the support member 386 and along the inner surface of the rotor hub 51. Then, this lubricating oil is discharged through the oil passages a82 to a84 to cool the coil ends 5b, 5b, and flows in the housing case 26 back into the oil pan.

As described above, in the input portion $9_5$ of the third embodiment, the engine driven oil pump 580 is placed on the outer peripheral side of the speed change mechanism 7. Thus, the engine driven oil pump 580 need not be placed on the inner peripheral side of the motor 3, whereby an increase in size of the input portion $9_5$ in the axial direction can be prevented, and the motor 3 and the clutch K0 can be reduced in diameter.

In the third embodiment, a wave spring 19w is formed on the outer peripheral side of each outer friction plate 19 of the clutch K0. This wave spring 19w keeps the outer friction plates 19 and the inner friction plates 17 separated from each other at regular intervals when the clutch K0 is disengaged, so that drag resistance is reduced.

Since the configuration, operation, and effects of the third embodiment are otherwise similar to those of the second embodiment, description thereof will be omitted.

[Other Possibilities of Hybrid Drive Device]

The hybrid drive devices 1 of the first and second reference examples and the first to third embodiments are described with respect to an example in which the motor 3 is directly drivingly coupled to the input shaft 15 via the clutch housing 50. However, the present invention is not limited to this, and the present invention is applicable to an example in which the motor is placed on other axis parallel to the input shaft 15 and is coupled to the input shaft 15 by a gear mechanism, a chain, etc.

The first and second reference examples and the first to third embodiments are described with respect to an example in which each of the input-shaft cooperative oil pump 70 and the engine driven oil pump 80, 180, 280, 380, 580 is an internal gear pump. However, the present invention is not limited to this, and each of these oil pumps may have any structure. For example, each of these oil pumps may be a crescent internal gear pump, a vane pump, an external gear pump, etc.

In the first and second reference examples and the first to third embodiments, the hybrid drive device includes the electric oil pump, not shown, in addition to the input-shaft cooperative oil pump 70 and the engine driven oil pump 80, 180, 280, 380, 580. However, while the vehicle is stopped with the internal combustion engine 2 being stopped (idle stop), the oil pressure can be supplied to the hydraulic control device 21 by forming a neutral state by driving the input-shaft cooperative oil pump 70 or the engine driven oil pump 80, 180, 280, 380, 580 by the motor 3 and disengaging the clutch or brake of the speed change mechanism 7. Thus, the electric oil pump may be eliminated.

The hybrid drive device according to the present invention can be used in vehicles such as passenger cars and trucks, and are preferably used as a hybrid drive device that is required to reduce drag of an engine connecting clutch and to ensure capability to cool the engine connecting clutch.

The invention claimed is:

1. A hybrid drive device, comprising:
an engine coupling shaft member that is drivingly coupled to an internal combustion engine;
a speed change mechanism that shifts rotation received by an input shaft member and outputs the shifted rotation to a wheel;
a rotating electrical machine drivingly coupled to the input shaft member;
a housing case containing the rotating electrical machine;
an engine connecting clutch that has a first friction plate drivingly coupled to the engine coupling shaft member, a second friction plate drivingly coupled to the input shaft member, and a hydraulic servo engaging or disengaging the first friction plate and the second friction plate, and that has both the first friction plate and the second friction plate placed in the housing case;
a first lubricating oil passage that scatters lubricating oil from radially inside to radially outside of the first friction plate and the second friction plate to lubricate the first friction plate and the second friction plate;
a coupling member;
a first one-way clutch that is interposed between the engine coupling shaft member and the coupling member, and that is not engaged when rotation of the engine coupling shaft member becomes lower than rotation of the coupling member;
a second one-way clutch that is interposed between the rotating electrical machine and the coupling member, and that is not engaged when rotation of the rotating electrical machine becomes lower than rotation of the coupling member; and
an engine driven oil pump that is drivingly coupled to the coupling member and generates an oil pressure to be supplied to the first lubricating oil passage by a driving force of the internal combustion engine or a driving force of the rotating electrical machine regardless of engagement or disengagement of the engine connecting clutch.

2. The hybrid drive device according to claim 1, further comprising:
a second lubricating oil passage that supplies the oil to the rotating electrical machine.

3. The hybrid drive device according to claim 2, wherein
the engine coupling shaft member has a recessed portion in an axial tip end of the engine coupling shaft member,
the input shaft member has a tip end of the input shaft member inserted in the recessed portion, and the input shaft member and the recessed portion are sealed by a seal member,
the input shaft member has a first oil passage formed in an axial direction and closed at the tip end, a second oil passage formed so as to extend through the input shaft member in a radial direction from the first oil passage, and a third oil passage formed parallel to the first oil passage in the axial direction and opened at the tip end,
the engine coupling shaft member has a fourth oil passage communicating with the third oil passage and formed in the axial direction, and a fifth oil passage formed so as to extend through the engine coupling shaft member in the radial direction from the fourth oil passage,
the first lubricating oil passage is formed by the first oil passage and the second oil passage, and
the second lubricating oil passage is formed by the third oil passage, the fourth oil passage, and the fifth oil passage.

4. The hybrid drive device according to claim 2, wherein the first one-way clutch and the second one-way clutch are lubricated by oil supplied from the second lubricating oil passage.

5. The hybrid drive device according to claim 3, wherein the first one-way clutch and the second one-way clutch are lubricated by oil supplied from the second lubricating oil passage.

6. The hybrid drive device according to claim 4, wherein the oil that has lubricated the first one-way clutch and the second one-way clutch is supplied to the rotating electrical machine.

7. The hybrid drive device according to claim 5, wherein the oil that has lubricated the first one-way clutch and the second one-way clutch is supplied to the rotating electrical machine.

8. The hybrid drive device according to claim 2, further comprising:
flow rate adjusting means that adjusts a flow rate of oil to be supplied to the first lubricating oil passage, wherein the second lubricating oil passage branches off at a position upstream of the flow rate adjusting means.

9. The hybrid drive device according to claim 3, further comprising:
flow rate adjusting means that adjusts a flow rate of oil to be supplied to the first lubricating oil passage, wherein the second lubricating oil passage branches off at a position upstream of the flow rate adjusting means.

10. The hybrid drive device according to claim 4, further comprising:
flow rate adjusting means that adjusts a flow rate of oil to be supplied to the first lubricating oil passage, wherein the second lubricating oil passage branches off at a position upstream of the flow rate adjusting means.

11. The hybrid drive device according to claim 5, further comprising:
flow rate adjusting means that adjusts a flow rate of oil to be supplied to the first lubricating oil passage, wherein the second lubricating oil passage branches off at a position upstream of the flow rate adjusting means.

12. The hybrid drive device according to claim 6, further comprising:
flow rate adjusting means that adjusts a flow rate of oil to be supplied to the first lubricating oil passage, wherein the second lubricating oil passage branches off at a position upstream of the flow rate adjusting means.

13. The hybrid drive device according to claim 7, further comprising:
flow rate adjusting means that adjusts a flow rate of oil to be supplied to the first lubricating oil passage, wherein the second lubricating oil passage branches off at a position upstream of the flow rate adjusting means.

14. The hybrid drive device according to claim 1, wherein
the engine connecting clutch has a clutch drum drivingly coupled to the input shaft member,
the second friction plate has an outer peripheral side of the second friction plate drivingly coupled to the clutch drum, and
the clutch drum has a through hole that is positioned so as to at least partially overlap the second friction plate as viewed in a radial direction, and that discharges the oil supplied to the first and second friction plates.

15. The hybrid drive device according to claim 1, further comprising:
a control portion that controls a hydraulic control device so as to supply the oil pressure generated by the engine driven oil pump to the engine connecting clutch while the engine connecting clutch is slipped.

* * * * *